(12) United States Patent
Hughes et al.

(10) Patent No.: US 9,619,581 B2
(45) Date of Patent: Apr. 11, 2017

(54) CONSTRUCTING QUERIES FOR EXECUTION OVER MULTI-DIMENSIONAL DATA STRUCTURES

(71) Applicant: Microsoft Corporation, Redmond, WA (US)

(72) Inventors: Gregory Hughes, Redmond, WA (US); Michael J. Coulson, Clyde Hill, WA (US); Alexandre Tristan St-Cyr, Seattle, WA (US); Faisal Mohamood, Woodinville, WA (US); Theresa Palmer-Boroski, Kirkland, WA (US); Clemens Szyperski, Bellevue, WA (US); Marius Dumitru, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 450 days.

(21) Appl. No.: 14/325,642

(22) Filed: Jul. 8, 2014

(65) Prior Publication Data
US 2015/0178407 A1 Jun. 25, 2015

Related U.S. Application Data

(60) Provisional application No. 61/919,349, filed on Dec. 20, 2013.

(51) Int. Cl.
*G06F 17/30* (2006.01)

(52) U.S. Cl.
CPC .. *G06F 17/30967* (2013.01); *G06F 17/30395* (2013.01); *G06F 17/30398* (2013.01); *G06F 17/30592* (2013.01); *G06F 17/30979* (2013.01)

(58) Field of Classification Search
CPC ......... G06F 17/30967; G06F 17/30395; G06F 17/30398
See application file for complete search history.

(56) References Cited

U.S. PATENT DOCUMENTS

| | | | |
|---|---|---|---|
| 5,696,962 A * | 12/1997 | Kupiec | G06F 17/30672 |
| 5,752,016 A * | 5/1998 | Whittaker | G06F 17/30398 |
| 5,983,218 A * | 11/1999 | Syeda-Mahmood | G06F 17/30893 707/711 |
| 6,750,864 B1 | 6/2004 | Anwar | |
| 7,337,163 B1 | 2/2008 | Srinivasan et al. | |
| 8,180,789 B1 * | 5/2012 | Wasserman | G06F 17/30389 707/707 |

(Continued)

OTHER PUBLICATIONS

"International Preliminary Report on Patentability Issued in PCT Application No. PCT/US2014/071004", Mailed Date: Jan. 28, 2016, 8 Pages.

(Continued)

*Primary Examiner* — Noosha Arjomandi
(74) *Attorney, Agent, or Firm* — Medley, Behrens & Lewis, LLC

(57) ABSTRACT

Various technologies pertaining to construction of a query for execution over a cube are described. Tabular data is presented on a displayed on a display screen, where the tabular data represents at least a portion of a data cube. Input is received with respect to the tabular data, and responsive to the input being received, a query is constructed based upon the input. The query is executed over the data cube, resulting in provisioning of a new table.

19 Claims, 17 Drawing Sheets

(56) References Cited

U.S. PATENT DOCUMENTS

| | | | |
|---|---|---|---|
| 8,655,841 B1* | 2/2014 | Sridharan | G06F 11/1461 707/609 |
| 8,825,620 B1* | 9/2014 | Fliedner | G06F 17/30979 707/706 |
| 8,849,810 B2* | 9/2014 | Lucovsky | G06Q 30/02 707/728 |
| 8,924,379 B1* | 12/2014 | Kim | G06F 17/30657 707/725 |
| 9,189,749 B2* | 11/2015 | Estes | G06N 5/022 |
| 2004/0054691 A1 | 3/2004 | Sharma et al. | |
| 2004/0083204 A1* | 4/2004 | Dettinger | G06F 17/30979 |
| 2004/0181543 A1* | 9/2004 | Wu | G06F 17/30572 |
| 2005/0004911 A1* | 1/2005 | Goldberg | G06F 17/30398 |
| 2005/0060191 A1* | 3/2005 | Parkins | G06Q 50/24 705/2 |
| 2005/0065926 A1* | 3/2005 | Chen | G06F 17/30454 |
| 2005/0091206 A1 | 4/2005 | Koukerdjinian et al. | |
| 2006/0010113 A1* | 1/2006 | Berger | G06F 17/30592 |
| 2006/0112123 A1 | 5/2006 | Clark et al. | |
| 2006/0173861 A1* | 8/2006 | Bohannon | G06F 17/30917 |
| 2006/0294087 A1* | 12/2006 | Mordvinov | G06F 17/30592 |
| 2007/0067711 A1 | 3/2007 | Woodall et al. | |
| 2007/0078823 A1* | 4/2007 | Ravindran | G06F 17/30592 |
| 2008/0010265 A1* | 1/2008 | Bangel | G06F 17/30418 |
| 2008/0098045 A1* | 4/2008 | Radhakrishnan | G06F 17/30551 |
| 2008/0201293 A1* | 8/2008 | Grosset | G06F 17/30592 |
| 2010/0082524 A1 | 4/2010 | Barber | |
| 2010/0082577 A1* | 4/2010 | Mirchandani | G06F 17/30592 707/706 |
| 2011/0191299 A1* | 8/2011 | Huynh Huu | G06F 17/30 707/646 |
| 2014/0046927 A1* | 2/2014 | Nelke | G06F 17/30979 707/713 |
| 2014/0059078 A1* | 2/2014 | Gulwani | G06F 17/30672 707/772 |
| 2014/0101147 A1* | 4/2014 | Foody | G06F 17/30401 707/729 |

OTHER PUBLICATIONS

"Response to Office Action for European Patent Application No. 14828094.4", Filed Date: Sep. 9, 2016, 9 Pages.

"Response to the Written Opinion for PCT Patent Application No. PCT/US2014/071004", Filed Date: Jun. 16, 2015, 9 pages.

"International Search Report & Written Opinion Issued in PCT Patent Application No. PCT/US2014/071004", Mailed Date: Mar. 10, 2015, 10 Pages.

"Hyperion Essbase—System9: Essbase Spreadsheet Add-in User's Guide for Excel", Retrieved on: Jan. 10, 2014, Retrieved at: <<http://docs.oracle.com/cd/E10530_01/doc/epm.931/essexcel.pdf>>, 200 pages.

"Using the OracleBI Spreadsheet Add-In with OLAP Data", Retrieved on: Jan. 10, 2014, Retrieved at: <<http://www.oracle.com/webfolder/technetwork/tutorials/obe/fmw/bi/r10122/ssa.htm#t1s1>>, 20 pages.

Moffat, Dick, "Using Excel CUBE Functions with PowerPivot", Published on: Jun. 19, 2010, Retrieved at: <<http://www.powerpivotpro.com/2010/06/using-excel-cube-functions-with-powerpivot/>>, 23 pages.

"Second Written Opinion Issued in PCT Patent Application No. PCT/US2014/071004", Mailed Date: Oct. 23, 2015, 7 Pages.

* cited by examiner

|   | A | B | C | D | E | F |
|---|---|---|---|---|---|---|
|   | DIM1, ATT1 | DIM1, ATT2 | DIM2, ATT1 | MEASURE |   |   |
| 1 | CHICAGO | USA | TENNIS | 1000 |   |   |
| 2 | LONDON | UK | HANDSET | 1200 |   |   |
| 3 | MADRID | SPAIN | APPLIANCES | 1350 |   |   |
| 4 | MADRID | SPAIN | COMPUTER | 200 |   |   |
| 5 | MARSEILLE | FRANCE | SWITCHES | 450 |   |   |
| 6 | NEW YORK | USA | BIKES | 975 |   |   |
| 7 | NEW YORK | USA | COMPUTER | 1500 |   |   |
| 8 | NEW YORK | USA | CONSOLE | 180 |   |   |
| 9 | PARIS | FRANCE | APPLIANCES | 3000 |   |   |
| 10 | PARIS | FRANCE | COMPUTER | 5500 |   |   |
| 11 | PARIS | FRANCE | CONSOLES | 45 |   |   |
| 12 | PARIS | FRANCE | SWITCHES | 1400 |   |   |
| 13 | QUEBEC | CANADA | HOME THEATER | 1250 |   |   |
| 14 | QUEBEC | CANADA | HANDSET | 700 |   |   |
| 15 | SEOUL | KOREA | APPLIANCES | 2600 |   |   |
| 16 | TORONTO | CANADA | HANDSET | 1450 |   |   |
| 17 | VANCOUVER | CANADA | GOLF | 980 |   |   |

FIG. 7

|   | DIM1, ATT1 | DIM1, ATT2 | DIM2, ATT1 | MEASURE1 |
|---|---|---|---|---|
| 1 | CHICAGO | USA | TENNIS | 1000 |
| 2 | LONDON | UK | HANDSET | 1200 |
| 3 | MADRID | SPAIN | APPLIANCES | 1350 |
| 4 | MADRID | SPAIN | COMPUTER | 200 |
| 5 | MARSEILLE | FRANCE | SWITCHES | 450 |
| 6 | NEW YORK | USA | BIKES | 975 |
| 7 | NEW YORK | USA | COMPUTER | 1500 |
| 8 | NEW YORK | USA | CONSOLE | 180 |
| 9 | PARIS | FRANCE | APPLIANCES | 3000 |
| 10 | PARIS | FRANCE | COMPUTER | 5500 |
| 11 | PARIS | FRANCE | CONSOLES | 45 |
| 12 | PARIS | FRANCE | SWITCHES | 1400 |
| 13 | QUEBEC | CANADA | HOME THEATER | 1250 |
| 14 | QUEBEC | CANADA | HANDSET | 700 |
| 15 | SEOUL | KOREA | APPLIANCES | 2600 |
| 16 | TORONTO | CANADA | HANDSET | 1450 |
| 17 | VANCOUVER | CANADA | GOLF | 980 |

SOURCE
EXPAND DIM1
EXPAND DIM2
ADD MEASURE1

|    | DIM1, ATT1 | DIM1, ATT2 |
|----|------------|------------|
| 1  | CHICAGO    | USA        |
| 2  | LONDON     | UK         |
| 3  | MADRID     | SPAIN      |
| 4  | MADRID     | SPAIN      |
| 5  | MARSEILLE  | FRANCE     |
| 6  | NEW YORK   | USA        |
| 7  | NEW YORK   | USA        |
| 8  | NEW YORK   | USA        |
| 9  | PARIS      | FRANCE     |
| 10 | PARIS      | FRANCE     |
| 11 | PARIS      | FRANCE     |
| 12 | PARIS      | FRANCE     |
| 13 | QUEBEC     | CANADA     |
| 14 | QUEBEC     | CANADA     |
| 15 | SEOUL      | KOREA      |
| 16 | TORONTO    | CANADA     |
| 17 | VANCOUVER  | CANADA     |

SOURCE
EXPAND DIM1
EXPAND DIM2
ADD MEASURE1

802

900

804

|   | DIM1, ATT1 | DIM1, ATT2 | DIM2, ATT1 |
|---|---|---|---|
| 1 | CHICAGO | USA | TENNIS |
| 2 | LONDON | UK | HANDSET |
| 3 | MADRID | SPAIN | APPLIANCES |
| 4 | MADRID | SPAIN | COMPUTER |
| 5 | MARSEILLE | FRANCE | SWITCHES |
| 6 | NEW YORK | USA | BIKES |
| 7 | NEW YORK | USA | COMPUTER |
| 8 | NEW YORK | USA | CONSOLE |
| 9 | PARIS | FRANCE | APPLIANCES |
| 10 | PARIS | FRANCE | COMPUTER |
| 11 | PARIS | FRANCE | CONSOLES |
| 12 | PARIS | FRANCE | SWITCHES |
| 13 | QUEBEC | CANADA | HOME THEATER |
| 14 | QUEBEC | CANADA | HANDSET |
| 15 | SEOUL | KOREA | APPLIANCES |
| 16 | TORONTO | CANADA | HANDSET |
| 17 | VANCOUVER | CANADA | GOLF |

SOURCE
EXPAND DIM1
EXPAND DIM2
ADD MEASURE1

|  | DIM1, ATT1 | DIM1, ATT2 | DIM2, ATT1 | MEASURE1 |
|---|---|---|---|---|
| 1 | CHICAGO | USA | TENNIS | 1000 |
| 2 | LONDON | UK | HANDSET | 1200 |
| 3 | MADRID | SPAIN | APPLIANCES | 1350 |
| 4 | MADRID | SPAIN | COMPUTER | 200 |
| 5 | MARSEILLE | FRANCE | SWITCHES | 450 |
| 6 | NEW YORK | USA | BIKES | 975 |
| 7 | NEW YORK | USA | COMPUTER | 1500 |
| 8 | NEW YORK | USA | CONSOLE | 180 |
| 9 | PARIS | FRANCE | APPLIANCES | 3000 |
| 10 | PARIS | FRANCE | COMPUTER | 5500 |
| 11 | PARIS | FRANCE | CONSOLES | 45 |
| 12 | PARIS | FRANCE | SWITCHES | 1400 |
| 13 | QUEBEC | CANADA | HOME THEATER | 1250 |
| 14 | QUEBEC | CANADA | HANDSET | 700 |
| 15 | SEOUL | KOREA | APPLIANCES | 2600 |
| 16 | TORONTO | CANADA | HANDSET | 1450 |
| 17 | VANCOUVER | CANADA | GOLF | 980 |

SOURCE
EXPAND DIM1
EXPAND DIM2
ADD MEASURE1

FIG. 11

```
LET
    SOURCE = [LOCATION]
    #"EXPAND CUSTOMER NAME" = EXPANDFUNCTION(CUBE ID, {[NAME = "CUSTOMER"]}[DATA]{[NAME = "CUSTOMER NAME"]}[DATA]...
    #"EXPAND CUSTOMER NAME" = EXPANDFUNCTION(CUBE ID, {[NAME = "PRODUCT"]}[DATA]{[NAME = "CATEGORY"]}[DATA]...
    #"ADD ORDERED QTY" = ADDMEASUREFUNCTION(EXPAND FUNCTION(DIMENSION NAME, MEASURE)...DATA]{[NAME = ...
IN
    #"ADD ORDERED QTY"
```

```
LET
    SOURCE = [LOCATION]
    #"EXPAND CUSTOMER NAME" = EXPANDFUNCTION(CUBE ID, {[NAME = "CUSTOMER"]}[DATA]{[NAME = "CUSTOMER NAME"]}[DATA]...
    #"EXPAND CUSTOMER NAME" = EXPANDFUNCTION(CUBE ID, {[NAME = "PRODUCT"]}[DATA]{[NAME = "CATEGORY"]}[DATA]...
    #"ADD ORDERED QTY" = ADDMEASUREFUNCTION(EXPAND FUNCTION(DIMENSION NAME, MEASURE)...DATA]{[NAME = ...
    FILTERED ROWS = SELECTROWFUNCTION(#"ADD ORDERED QTY", EACH [CUSTOMER NAME.CITY] <> "NEW YORK"),
    COLLAPSEDATTRIBUTES = COLLAPSEFUNCTION (FILTEREDROWS, {"CUSTOMER NAME.CITY", "CATEGORY NAME.CUSTOMER NAME...
IN
    COLLAPSEDATTRIBUTES
```

FIG. 16

CONSTRUCTING QUERIES FOR EXECUTION OVER MULTI-DIMENSIONAL DATA STRUCTURES

RELATED APPLICATION

This application claims priority to U.S. Provisional Patent Application No. 61/919,349, filed on Dec. 20, 2013, and entitled "CONSTRUCTING QUERIES FOR EXECUTION OVER MULTI-DIMENSIONAL DATA STRUCTURES", the entirety of which is incorporated herein by reference.

BACKGROUND

Computer-implemented business intelligence (BI) applications have been developed to facilitate discovery of knowledge (e.g., a business fact) that may assist a business in reaching a business goal. With more particularity, a user of a business intelligence application can formulate a query that is to be executed over data pertaining to a particular business. Conventionally, the data pertaining to the business is structured as at least one relational database that comprises at least one two-dimensional table.

While conventional BI applications provide an adequate interface to assist users in acquiring business knowledge when the data pertaining to the business is structured as relational databases, conventional business intelligence applications are not as well-suited for discovering business knowledge from a multidimensional data structure (e.g., a data cube, sometime referred to as a "hypercube"). In an example, when data pertaining to a business is structured as a data cube, a user who wishes to obtain business knowledge by querying the data cube must have a priori knowledge of the contents of the cube. Further, the user must be familiar with a query language that can be used to execute queries over the data cube. Moreover, the user must have knowledge of slices and/or dices of the data cube that are of interest when formulating the query. Thus, the user must formulate a final query, which may not result in presentment of desired business knowledge.

SUMMARY

The following is a brief summary of subject matter that is described in greater detail herein. This summary is not intended to be limiting as to the scope of the claims.

A computing system is described herein, where the computing system includes a processor and a memory. The memory includes a business intelligence (BI) application that is executed by the processor. The BI application is configured to construct a query based upon incremental modifications to previous versions of the query. The query is represented as a sequence of query steps, each step in the sequence of query steps corresponds to a respective incremental modification in the incremental modifications. The BI application is further configured to retrieve tabular data from a data cube based upon the query.

BRIEF DESCRIPTION OF THE DRAWINGS

FIGS. 5-16 are exemplary graphical user interfaces that facilitate constructing a query that can be executed over a multidimensional data structure.

DETAILED DESCRIPTION

Figure 1:
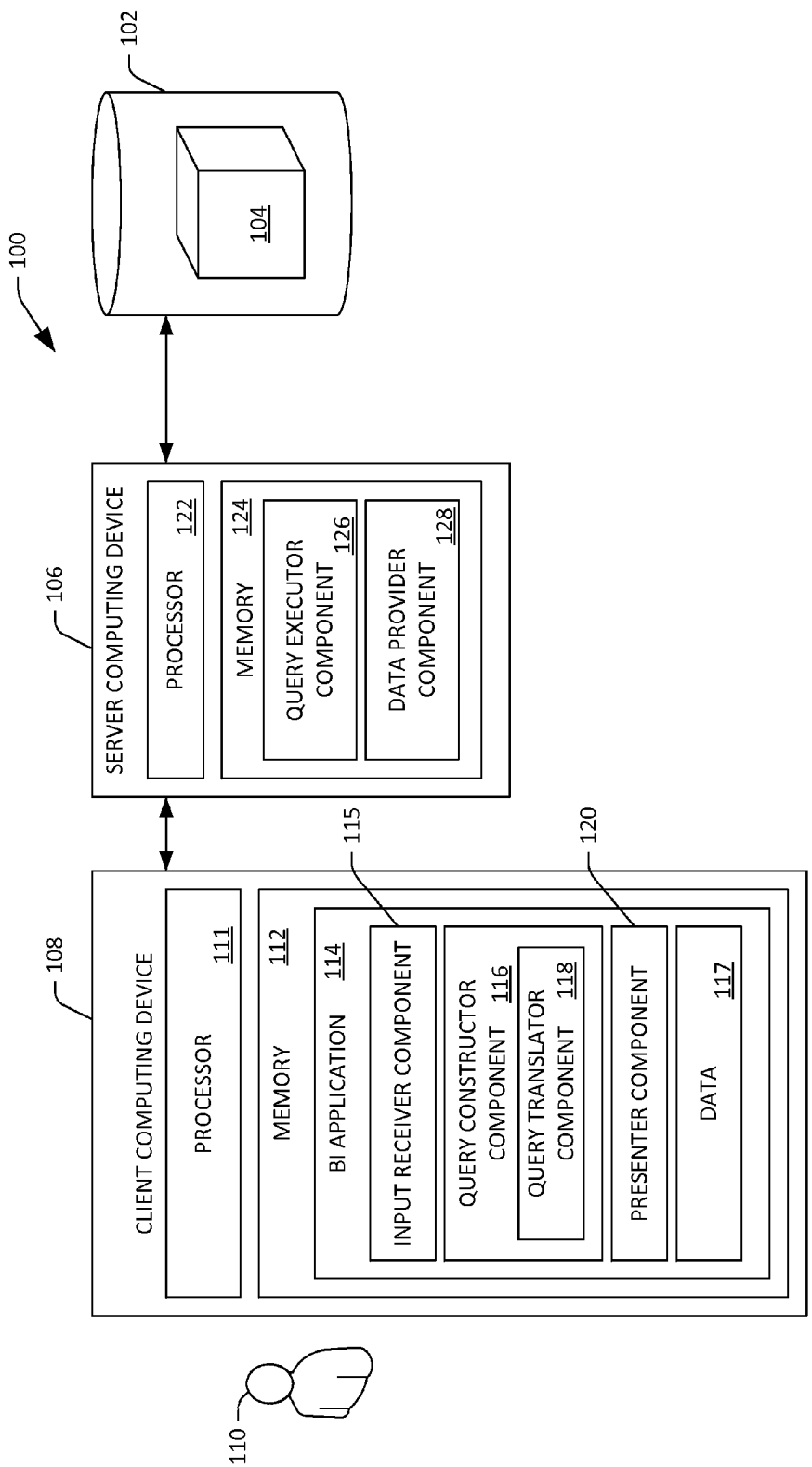
FIG. 1 is a functional block diagram of an exemplary system that facilitates constructing a query for execution over a multidimensional data structure.

Various technologies pertaining to constructing a query over a series of stages, wherein the query is configured to execute over a multi-dimensional data structure, are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by a single system component may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

Described herein are various technologies pertaining to construction of a query that is configured to be executed over a multidimensional data structure (e.g. a cube, which may also be referred to as a hypercube, a data cube, etc.). A cube is defined over a set of related tables, for example, using a star or snowflake schema that comprises at least one fact table and a series of dimension tables (also referred to as "dimensions") related to the fact table. Fact rows (rows in the fact table) can be grouped by dimension "attributes" (e.g., columns of the dimension tables). "Measures" are aggregate functions applied against the columns of a set of fact rows (e.g., a summation function over values in a set of fact rows).

With more particularity, the fact table of a cube comprises measurements, metrics, or facts of a business process and is located at the center of a star or snowflake schema and surrounded by dimensions. The dimensions provide structured labeling information to otherwise unordered numeric measures. Accordingly, the dimensions include respective individual, non-overlapping data elements. Dimensions are typically used in connection with filtering, grouping, and labeling data. The term "slicing" refers to filtering data from the cube, while the term "dicing" refers to grouping data in the cube. Oftentimes, dimensions have dimension attributes, which are organized hierarchically. For instance, the dimension may represent time, with several possible hierarchical attributes. For instance, the dimension may include the dimension attributes "days", "weeks", "months", and "years." The attribute "days" can be grouped (collapsed) into "months", which can be collapsed into "years". Similarly, days can be collapsed into "weeks", which can be collapsed into "years", etc. Finally, a measure of the cube is a property over which calculations can be made, wherein such calculations include sum, count, average, minimum, and maximum.

Cube data can be represented in a single flat table that comprises attributes and measure applications—this flat table can be referred to as a "fact table." Cube operations are "lowered" to a representation expressed in terms of relational operators. A "dimension table" refers to a table that includes a column for each attribute of the dimension. Members of each dimension attribute can be enumerated, yielding a cross-product of members of the attributes of a dimension. Various examples relating to cubes will be set forth herein.

With reference now to FIG. 1, an exemplary system 100 that facilitates constructing a query that can be executed over a multidimensional data structure (referred to herein as a cube) is illustrated. Further, the system 100 can facilitate constructing the query in a staged approach, where the query can be refined as a user (or computing device) is presented with data, such that the query is refined based upon a user analysis of the presented data or a computer analysis of the presented data. The system 100 includes a data store 102 that comprises a cube 104. While the cube 104 is shown as being included in the data store 102, it is to be understood that the cube 104 may be distributed across multiple data stores. Moreover, the cube 104 can represent a combination of several cubes potentially having different respective structures.

The system 100 may additionally comprise a server computing device 106 that is configured with computer executable instructions that allow for the server computing device 106 to execute queries over the cube 104 and output data responsive to executing the queries over the cube.

The system 100 may further include a client computing device 108 that can be configured to receive and/or construct a query for execution over the cube 104 based upon input from a user 110 or computer program. The client computing device 108 is in communication with the server computing device 106, and can transmit the query to the server computing device 106. The client computing device 108 can be any suitable computing device, including but not limited to a desktop computing device, a laptop computing device, a tablet (slate) computing device, a mobile telephone, a convertible computing device, a wearable computing device (e.g., a watch, headwear, or the like), a phablet, a video game console, or the like.

The client computing device 108 comprises a processor 111 and a memory 112, wherein the processor 111 can execute instructions in the memory 112. As shown, the memory 112 includes a business intelligence (BI) application 114, which is executed by the processor 111. The BI application 114 is configured to extract business knowledge from the cube 104 and present the business knowledge to the user 110 (e.g., visualize the business knowledge). In an exemplary embodiment, the BI application 114 can be or be included in a spreadsheet application. While the BI application 114 is shown as being executed on the client computing device 108, it is to be understood that the BI application 114 may execute in a computing device that is accessible to the client computing device 108 by way of a network connection. For example, the client computing device 108 may have a browser or other suitable application executing thereon, wherein, for instance, the browser can be directed to a remotely situated computing device that executes the BI application 114. That is, the BI application 114 can be a web-based application or offered as a web service. Further, it is to be understood that the data store 102, the server computing device 106, and/or the client computing device 108 may be situated on a single computing device; thus the architecture of the system 100 is exemplary in nature, and not intended to be limiting.

The BI application 114 includes an input receiver component 115 that receives input from the user 110 (or a computer-executable program) with respect to the data cube 104. For example, the input receiver component 115 can receive input that indicates a desire to load contents of the cube 104 (at least a portion of the cube 104) into a portion of the memory 112 of the client computing device 108 that is allocated to the BI application 114. Additionally or alternatively, to increase performance, responsive to the input receiver component 115 receiving an indication that the cube 104 is desirably accessed, the BI application 114 can be configured to open a communications channel with the server computing device 106, such that an entirety of the cube 104 need not be loaded into the memory 112 of the client computing device 108.

The BI application 114 further includes a query constructor component 116 that constructs a query based upon input received by the input receiver component 115. For example, responsive to the input receiver component 115 receiving a request to load the cube 104 into the memory 112, the query constructor component 116 can generate a query that, when executed by the server computing device 106 over the cube 104, causes an entirety of the cube 104 to be retrieved from the data store 102 and loaded into the memory 112 of the client computing device 108 (e.g., where it is represented as data 117). As indicated previously, the BI application 114 may be configured to generate queries that can be executed over multiple different types of multidimensional structures. Accordingly, as will be described in greater detail herein, the query constructor component 116 can initially generate a query in a relatively high-level language that is common across all types of cubes that the BI application 114 is configured to support. Such a query can be referred to as a "high level" query. The query constructor component 116 can include a query translator component 118 that can translate the high-level query into a query that is supported by the server computing device 106. Therefore, in an example, when the BI application 114 is configured to support querying of three different types of cubes, the user 110 need not learn three different query languages to query over the three different types of cubes. Instead, the query constructor component 116 and the query translator component 118 are configured to handle the construction of queries in a query language that corresponds to the cube being accessed.

The BI application 114 additionally includes a presenter component 120 that is configured to present the data 117 in the memory 112, for instance, on a display of the client computing device 108. Pursuant to an example, when the query constructor component 116 constructs the query based upon the input received by the input receiver component 115, the query constructor component 116 can be configured to transmit the query to the server computing device 106.

The server computing device 106 includes a server processor 122 and a server memory 124, wherein the server memory 124 comprises components that can be executed by the server processor 122. The server memory 124 includes a query executor component 126 that receives the query from the client computing device 108 and executes the query over the cube 104 in the data store 102. The server memory 124 further includes a data provider component 128 that receives the data from the cube 104 based upon the query executed by the query executor component 122, and the data provider component 124 provides such data 117 to the client computing device 108, where it is placed in a portion of the memory 112 accessible to the BI application 114. The presenter component 120 retrieves the data 117 from the memory 115 and presents such data to the user 110 (e.g., in tabular format).

Once presented with the data, the user 110 may provide additional input with respect to the presented data. For instance, the user 110 may wish to be presented with measures corresponding to a particular dimension attribute (e.g., the dimension attribute "day" for the dimension that is representative of time). In another example, the user 110 may wish to filter measures based upon particular dimension attributes (e.g., the user 110 may wish to exclude certain days represented in the data 117). In another example, the user may wish to expand a dimension attribute, such that a more granular attribute is shown on the display screen (thereby increasing the number of rows in the data presented to the user 110). Still further, the user 110 may wish to collapse a dimension attribute, such that a coarser attribute is shown on the display screen (thereby decreasing the number of rows in the data presented to the user 110). The input receiver component 114 can receive such input, and the query constructor component 116 can refine the above-mentioned query based upon the input. The query is transmitted by the client computing device 108 to the server computing device 106, and the query executor component 126 of the server computing device 106 executes the refined query over the cube 104. The data provider component 128 provides data returned based upon execution of the query over the cube 104 to the client computing device 108, where it is placed in the memory 112 as the data 117. The presenter component 120 presents the data 117 in tabular form to the user 110. The user 110 may then optionally provide additional input with respect to the presented data or previous stages of the query to further refine the query.

It can therefore be ascertained that the user 110 can cause a query to be constructed over a plurality of stages (or steps), wherein the user 110 can be presented with tabular data retrieved from querying a cube, and can then choose additional operations that are to be performed over the tabular data to refine the query. Thus, the user 110 can construct or refine the query by reviewing data and then specifying additional operations to perform over the data. This is in contrast to conventional approaches, where the user 110 must have knowledge of a query language supported by the query executor component 126, must have knowledge of a portion of the cube that is of interest to the user 110, and must then construct a query to retrieve the portion of the cube that is of interest, where the query is in the query language referenced above. In conventional approaches, when the constructed query does not result in presentment of desired data to the user 110, the user 110 must construct a new query (e.g., from scratch), rather than through the "query by example" approach set forth herein. Thus, utilizing the aspects described herein, the user 110 can readily explore contents of the cube 104 to acquire business knowledge.

Various examples pertaining to operation of the system 100 are now set forth. As indicated previously, the cube 104 can be represented as a flat table that comprises dimension attributes and measure applications, wherein the flat table can be referred to as a "fact" table. A query to be executed over the cube 104 can be "lowered" to a representation expressed in terms of relational operators, thus allowing for the user 110 to interact with the cube 104 without being forced to learn specific query languages. Generally, a relational operator is a construct that tests or defines a relation between two entities. Exemplary relational operators include, but are not limited to, row filters, column selection, sort, amongst others.

A dimension table is a table that includes a column for each attribute of the dimension. Thus, for instance, a "time" dimension table may include separate columns for year, month, week, day, and so on. In a dimension table, the members of each dimension attribute are enumerated, yielding a cross-product of the members of the attributes of a dimension. For instance, a customer table for a "Customer Geography" dimension is set forth below in Table 1:

TABLE 1

| | Customer Geography.Country | Customer Geography.State-Province | Customer Geography.City |
|---|---|---|---|
| 1 | Australia | New South Wales | Alexandria |
| 2 | Australia | New South Wales | Coffs Harbour |
| 3 | Australia | New South Wales | Darlinghurst |
| 4 | Australia | New South Wales | Goulburn |
| 5 | Australia | New South Wales | Lane Cove |
| 6 | Australia | New South Wales | Lavender Bay |
| 7 | Australia | New South Wales | Malabar |
| 8 | Australia | New South Wales | Matraville |
| 9 | Australia | New South Wales | Milsons Point |
| 10 | Australia | New South Wales | Newcastle |

Conceptually, a fact table has dimension tables related to it by way of joins ("expanded" dimensions) or nested joins ("collapsed" dimensions). For example, a fact table with "Customer Geography" and "Product" as collapsed dimensions is shown in Table 2:

TABLE 2

| | Customer Geography ←→ | Product ←→ |
|---|---|---|
| 1 | Table | Table |

This table results in a nested join of the fact table with each of these dimension tables, e.g.:

Table.NestedJoin(factTable, { }, #"Customer Geography", { }, "Customer Geography")

where, referring to the arguments in order, "factTable" is the fact table, "{ }" is the left-hand side keys, "#'Customer Geography'" is the dimension table, "{ }" is the right hand side keys, and "Customer Geography" is the name of the column to create in which to place nested tables. Each row in the fact table represents a coordinate that selects some subset of the data in the cube. In this case, with an unfiltered and unexpanded set of dimensions, all of the data in the cube 104 would be selected for this single (and only) row in the fact table. The BI application 114 can act to filter content for display, thus outputting a display layer. This display layer can hide the collapsed dimensions (e.g., to provide a better and less confusing user experience). It is to be understood that every single dimension need not be presented in this manner, but instead dimensions that have been "touched" by the user 110 can be presented as the user 110 is working with the cube 104.

As indicated previously, a dimension table can be expanded to produce finer-grained coordinates, and the query constructor component 116 can construct a query that causes such expansion to occur. For example, expanding the "Customer Geography" dimension and selecting the Country, Province, and City attributes results in the cross-product of these expanded attributes and the rows of the fact table, as shown in Table 3:

TABLE 3

| | Customer Geography.Country | Customer Geography.State-Province | Customer Geography.City | Product |
|---|---|---|---|---|
| 1 | Australia | New South Wales | Alexandria | Table |
| 2 | Australia | New South Wales | Coffs Harbour | Table |
| 3 | Australia | New South Wales | Darlinghurst | Table |
| 4 | Australia | New South Wales | Goulburn | Table |
| 5 | Australia | New South Wales | Lane Cove | Table |
| 6 | Australia | New South Wales | Lavender Bay | Table |
| 7 | Australia | New South Wales | Malabar | Table |
| 8 | Australia | New South Wales | Matraville | Table |
| 9 | Australia | New South Wales | Milsons Point | Table |
| 10 | Australia | New South Wales | Newcastle | Table |

In an example, this can be modeled as expanding the "Customer Geography" column resulting from the nested join represented above, e.g.:

```
Table.ExpandTableColumn(
    Table.NestedJoin(factTable, { }, #"Customer Geography",
    { }, "Customer Geography"),
    "Customer Geography",
    {"Country", "State-Province", "City"}
)
```

Here, the "Customer Geography" argument identifies the column to expand; the list of columns to extract from the table is also provided. This is also equivalent to a (flat) join between the fact table and the dimension tables, e.g.:

Table.Join(factTable, { }, #"Customer Geography", { }) where "factTable" identifies the fact table, "{ }" represents left-hand side keys, "#'Customer Geography'" is the dimension table, and "{ }" is the right-hand side keys. It can be noted that the "Product" dimension remains collapsed, and can be hidden from view. Each row can select the subset of data in the cube 104 corresponding to the noted coordinate, e.g., row 3 can select all data from Darlinghurst in New South Wales, Australia, for all Products.

As indicated previously, a measure can be modeled as a computed column over the dimension coordinate of a row. It is a column that is the result of the same function being applied to each row in the table. For example, applying the "Internet Sales Amt." measure results in the addition of a computed column, as shown in Table 4:

TABLE 4

| | Customer Geography.Country | Customer Geography.State-Province | Customer Geography.City | Product | Internet Sales Amt. |
|---|---|---|---|---|---|
| 1 | Australia | New South Wales | Alexandria | Table | null |
| 2 | Australia | New South Wales | Coffs Harbour | Table | 235454 |
| 3 | Australia | New South Wales | Darlinghurst | Table | 155010 |
| 4 | Australia | New South Wales | Goulburn | Table | 310875 |
| 5 | Australia | New South Wales | Lane Cove | Table | 220083 |
| 6 | Australia | New South Wales | Lavender Bay | Table | 195122 |
| 7 | Australia | New South Wales | Malabar | Table | 176905 |
| 8 | Australia | New South Wales | Matraville | Table | 216564 |
| 9 | Australia | New South Wales | Milsons Point | Table | 187075 |
| 10 | Australia | New South Wales | Newcastle | Table | 245936 |

Responsive to the input receiver component 115 receiving a request to compute the above-mentioned measure, the query constructor component 116 can construct a query such as the following that causes the measure to be computed:

```
Table.AddColumn(
    factTable,
    "Internet Sales Amount",
    (row) =>ApplyMeasure(
        #"Internet Sales Amount",
        [
            Country = row[Country],
            #"State-Province" = row[State-Province],
            City = row[City],
            Product = row[Product]
        ]
    )
)
```

In this example, the measure "#'Internet Sales Amount" is applied against a record constructed from the available dimension coordinates. In the example set forth above, the individual members (depending on the row) of the attributes of the "Customer Geography" dimension can be passed to each invocation of the measure while the entire collapsed set of "Product" members can be passed to each invocation of the measure. In this way, the measure is applied to the subset of the cube 104 described by that row. For example, row 3 in Table 4 above applies the Internet Sales Amount measure to the subset of the cube 104 for all products and in the Darlinghurst, New South Wales, Australia geographic region.

A final projection layer can be placed on top of the table of the cube 104 that hides the collapsed dimension columns so they do not interfere with the user 110 or confuse the user 110. The projection can be performed using an operator that is configured to remove columns from a table (e.g., Table.RemoveColumns).

Further, the query constructor component 116 can construct a query that causes measures to be "floated" when an indication that expansion or collapsing of a dimension is requested. For instance, users expect that selected measures be applied to a current set of dimension coordinates, and for the measures to update when the dimension coordinates are changed. For example, if the "Internet Sales Amount" measure is applied to a fully collapsed cube, the following exemplary table may be presented:

TABLE 5

| | Internet Sales Amount |
|---|---|
| 1 | 29358677 |

The input receiver component 115 can receive a request to expand the "Country" attribute of the "Customer Geography" dimension, and the query constructor component 116 can construct a query that causes a table that the user 110 expects to see to be presented:

TABLE 6

| | Internet Sales Amount | Customer Geography.Country |
|---|---|---|
| 1 | 9061000 | Australia |
| 2 | 1977844 | Canada |
| 3 | 2644017 | France |
| 4 | 2894312 | Germany |
| 5 | 3391712 | United Kingdom |
| 6 | 938789 | United States |

This is referred to as "floating" measures. As indicated previously, the query constructor component 116 can identify a request to compute a measure, and can position the computation in a constructed query to a point after the relevant dimension attribute has been selected.

In another example, a column can be a computed column, where a computed column carries a function that was used to construct the column. For example, a user can review Table 6 and ask for the function used to compute the "Internet Sales Amount" column:
ComputedColumn(factTable, "Internet Sales Amount"), resulting in the return of the following expression:

```
(row) => ApplyMeasure(
    #"Internet Sales Amount",
    [
        Country = row[Country]
    ]
)
```

If a new column were to be created with this function, an exact copy of the original column will be provided.

Computed columns can be used to float a measure. Whenever a cube operation that changes the dimensionality of a cube (e.g., a dimension is added, a dimension is expanded, or a dimension is collapsed) is applied, all measures can be floated such that the measures are recomputed against the right set of dimension coordinates. The system 100 can perform a multi-step process to float the measure appropriately. With more specificity, first, the query constructor component 116 can collect expressions for computed columns of the table that represent measure applications. Thereafter, the query constructor component 116 can remove the computed columns for measure applications from the table. The dimensionality of the table can then be updated, for instance, by adding a measure, expanding a dimension, or collapsing a dimension. The measure application expressions are adjusted to incorporate the new dimensionality, and the new measure application expressions are applied to the table. In this manner, the measure applications can be reordered to appear as if they have occurred after the dimensionality of the cube was adjusted.

For example, if the user 119 starts with the "Internet Sales Amount" measure applied to just the "Country" dimension attribute, and expands the "Customer Geography dimension to include the "City" attribute, the following process can occur (referring to Table 6). First, the query constructor component 116 can extract the expression for the computed column:

```
(row) => ApplyMeasure(
    #"Internet Sales Amount",
    [
        Country = row[Country]
    ]
)
```

Thereafter, the query constructor component 116 can construct the query such that the computed column is removed:
Table.RemoveColumns(factTable, {"Internet Sales Amount"})

Table 7 illustrates the resulting table (where the computed column in Table 6 has been removed).

TABLE 7

| | Customer Geography.Country |
|---|---|
| 1 | Australia |
| 2 | Canada |
| 3 | France |
| 4 | Germany |
| 5 | United Kingdom |
| 6 | United States |

The dimensionality change can subsequently be applied: e.g.:

ExpandDimension(factTable, #"Customer Geography", {"City"})

This expansion is shown in Table 1.

The query constructor component 116 adjusts the expression for the measure to include the new dimensionality:

```
(row) => ApplyMeasure(
    #"Internet Sales Amount",
    [
        Country = row[Country],
        City = row[City]
    ]
)
```

Here, then, the expression for the measure contemplates the "City" attribute of the "Customer Geography" dimension.

Finally, the query constructor component 116 can reapply the new measure:

```
Table.AddColumn(
    factTable,
    "Internet Sales Amount",
    (row) => ApplyMeasure(
        #"Internet Sales Amount",
        [
            Country = row[Country],
            City = row[City]
        ]
    )
)
```

For example, this can result in Table 8 being generated by the query executor component 126.

TABLE 8

|   | Internet Sales Amount | Customer Geography.Country | Customer Geography.State-Province | Customer Geography.City |
|---|---|---|---|---|
| 1 | null | Australia | New South Wales | Alexandria |
| 2 | 235454 | Australia | New South Wales | Coffs Harbour |
| 3 | 155010 | Australia | New South Wales | Darlinghurst |
| 4 | 310875 | Australia | New South Wales | Goulburn |
| 5 | 220083 | Australia | New South Wales | Lane Cove |
| 6 | 195122 | Australia | New South Wales | Lavender Bay |
| 7 | 176905 | Australia | New South Wales | Malabar |
| 8 | 216564 | Australia | New South Wales | Matraville |
| 9 | 187075 | Australia | New South Wales | Milsons Point |
| 10 | 245936 | Australia | New South Wales | Newcastle |

This "floating" of measure columns is sound under functional and iterative composition. In other words, further steps in the query that alter dimensionality of the cub table (and thus float measures) can continue to be accumulated without having to go back and adjust any of the previous steps in the chain.

The system 100 further supports cube operators that can be used to manipulate cube data. Such operators can be wrappers around existing relational primitives, with the exception that the operators add other operations to float measures around the core relational operation. For completeness, a FactRowsExist function is introduced below that selects only the coordinate combinations from the cross product of all dimensions that actually select some fact rows from the data in the underlying cube 104. A similar filter can be used to preserve the correct semantics of the cube operations when they are lowered to the relational space.

First, an "AddDimension" operator is described, which adds a dimension to a table. This operator receives an identity of the fact table, an identity of a column name of a dimension table, and an identity of the dimension table as input. For example: AddDimension(factTable, dimensionColumnName, dimensionTable) can incorporate a (possibly filtered) dimension table into the fact table using a nested join. This operator can change the cube dimensionality if the dimension table was filtered. It can be noted that dimension table filtering can be accomplished by way of an operator that selects rows in a table (e.g., Table.SelectRows). A lowered relational form of the exemplary operator is set forth below:

```
Table.AddColumns(
  Table.SelectRows(
    Table.NestedJoin(
      Table.RemoveCoumns(factTable, {measure columns, ... }),
      { },
      dimensionTable,
      { },
      dimensionColumnName),
    (row) => FactRowsExist(row coordinate)),
  columns ctor for measure columns)
```

An "ExpandDimension" operator expands attributes of a previously-attached (e.g., by way of the AddDimension operator) dimension table, and changes cube dimensionality. This exemplary operator takes the fact table, an identity of a dimension column name, and an identity of at least one attribute name as input; e.g., ExpandDimension(factTable, dimensionColumnName, {dimensionAttributeName1, ... }). An exemplary lowered relational form of this operator is set forth below:

```
Table.AddColumns(
  Table.ExpandTableColumn(
    Table.RemoveColumns(factTable, {measure columns}),
    dimensionColumnName,
    {dimension attributes, ... })
  columns ctor for measure columns)
```

A "CollapseDimension" operator collapses attributes of a previously-expanded dimension, and changes cube dimensionality. The exemplary CollapseDimension operator takes the fact table and an identity of at least one attribute name as input; e.g., CollapseDimension(factTable, {dimensionAttributeName1, ... }). It can be noted that it is possible to add a filter against dimension members (and measures) by way of an operator that selects rows prior to collapsing a dimension. For instance, this can create a slice against a dimension, and can be used to implement cross-filtering of dimensions and measures (e.g., a filter that references multiple dimensions at once in an "or" clause). An exemplary lowered relational form of the CollapseDimension operator is shown below:

```
Table.AddColumns(
  Table.Group(
    Table.RemoveColumns(factTable, {measure columns}),
    {all other dimension attributes},
    {ctor for table of members of collapsed dimension
      attribute})
```

An "AddMeasure" operator applies the measure to the fact table, where the dimension coordinate record can be of the form shown in earlier examples. The AddMeasure operator takes as input the factTable, an identity of a column name, and an identity of a measure function that is to be applied; e.g., AddMeasure(factTable, columnName, measureFunction). An exemplary lowered relational form of the AddMeasure operator is shown below:

```
Table.AddColumn(
  factTable,
  columnName,
  (row) => ApplyMeasure(
    measureFunction,
    [dimension coordinate record for row]))
```

Queries expressed in the forms noted above can be translated and provided in any order (e.g., by the query constructor component 116 and/or the query executor component 126) into a query that can be executed against the target cube 104. The description set forth below assumes familiarity with abstract syntax trees (ASTs) and/or expression trees, and further assumes familiarity with normalization of such trees into standard forms. Conceptually, the process of query translation is set forth below. First, the user 110 (or program) expresses operations in terms of cube and relational operators. Thereafter, cube operations are "lowered" into relational operators and floating measures. Subsequently, expressions are normalized to reorder operators and settle to normalized expression tree patterns. Then, the normalized expression tree patterns can be "raised" into a "cube expression" to match expectations of cube servers—e.g., such that the query executor component 126 can execute the query. The cube expression can then be translated into a server-specific syntax.

Exemplary query normalization rules that can be applied by the query constructor component 116 are now set forth.

For instance, column selection and row filters can be pushed as far down into the expression tree as possible. A nested join that is expanded can be converted into a flat join; e.g., ExpandTableColumn(NestedJoin(x,y),{all cols of y})->Join (x,y). A removal of an added column is as if the column were never added: e.g., RemoveColumn(AddColumn(x),x)->no-op. A grouping on top of a flat join can be converted into a nested join in certain cases: e.g., Group(Join(x,y),{all cols of x},{table of y})->NestedJoin(x,y).

Exemplary actions pertaining to translation to a "cube expression", which can be performed by the query constructor component 116, are now set forth. Specific normalized patterns can be detected within a lowered query expression and translated into a "cube expression"—an expression tree that closely matches the grammar of multi-dimensional query languages. In an example, a flat join with a dimension table adds the attributes of the dimension to the cube expression: e.g., Join(factTable, { }, dimensionTable, { }) translates to the following:

```
Query
    From: factTable cube
    Dimensions: [dimAttr1], [dimAttr2], . . .
    Measures:
    Filter: (null)
```

In another example, a nested join with a filtered dimension table pushes a filter against the attributes of the dimension (e.g., a slicer) into a sub-query of the cube expression. For example, NestedJoin(factTable, { }, SelectRows(dimensionTable, (r)=>r[City]="Seattle")) translates to the following:

```
Query
    From:
        Query
            From: factTable cube
            Dimensions: [City]
            Measures:
            Filter: equals([City], "Seattle")
        Dimensions:
        Measures:
        Filter:
```

In yet another example, a measure application adds a measure reference to the cube expression. For example,

```
AddColumn(
    factTable,
    "Internet Sales Amount",
    (row) => ApplyMeasure(#"Internet Sales Amount", [ ]))
``` translates to:

```
Query
    From: factTable cube
    Dimensions:
    Measures: [Internet Sales Amount]
    Filter:
```

In yet another example, a row filter (e.g., SelectRows) can be translated into a filter expression against the measures and dimensions. Thus, for instance, Table.SelectRows(factTable, each [Internet Sales Amount]>500) translates to the following:

```
Query
    From: factTable cube
    Dimensions:
    Measures: . . .
    Filter: greater-than([Internet Sales Amount], 500)
```

In still yet another example, a group of all other dimensions is translated into a "collapse" operation of the remaining dimension. The collapsed dimension can be pushed into a sub-query in the cube expression, and the other dimensions remain in the outer cube expression. Therefore, for example, Table.Group(factTable, {"dim2", "dim3"}, {"collapsed dim1", (rows)=>rows[dim1]}) translates to the following:

```
Query
    From:
        Query
            From: factTable cube
            Dimensions: [dim1]
            Measures:
            Filter:
        Dimensions:
        Measures: [dim2], [dim3]
        Filter:
```

The query constructor component 116 can translate the cube expression to an expected language and syntax of a target cube server. Numerous examples are set forth below to clarify the actions described above.

Example 1

Add a Dimension

The following query can be presented by a user or program:
AddDimension(emptyFactTable, "Customer Geography", #"Customer Geography")
The query constructor component 116 can lower the query into the following:

```
Table.SelectRows(
    Table.NestedJoin(
        emptyFactTable,
        { },
        #"Customer Geography",
        { },
        "Customer Geography"),
    (row) => FactRowsExist([#"Customer Geography" = row[Customer Geography]]))
```

For this exemplary query, no normalization is performed, and the above is translated into an empty cube expression (since there is no cube operation to perform). Further, the query need not be translated into the language of a cube server, since there is no query to be performed over the cube 104. The result is the return of an empty table.

Example 2

Expand a Dimension

In the following examples, the format of the cube expression is as follows: "From" refers to an input cube; "Dimensions" refer to dimensions to be expanded; "Measures" are measures to apply; and the filter referenced in the examples filters resulting rows based upon its predicates. The following query can be presented by a user or program:

```
ExpandDimension(
    AddDimension(emptyFactTable, "Customer Geography",
    #"Customer Geography"),
        {"Country", "State-Province", "City"})
```

The query constructor component 116 can lower the query as follows:

```
Table.ExpandTableColumn(
    Table.SelectRows(
        Table.NestedJoin(
            emptyFactTable,
            { },
            #"Customer Geography",
            { },
            "Customer Geography"),
        (row) => FactRowsExist(#"Customer Geography" =
        row[Customer Geography])),
    {"Country", "State-Province", "City"})
```

The query constructor component 116 can then normalize the lowered expression by pushing the ExpandTableColumn through SelectRows, and then converting the ExpandTableColumn(NestedJoin) pattern into a flat Join as follows:

```
Table.SelectRows(
    Table.Join(
        emptyFactTable,
        { },
        #"Customer Geography",
        { }),
    (row) => FactRowsExist([#"Customer Geography" =
    row[Customer Geography]))
```

The query constructor component 116 can then translate the normalized expression into a cube expression:

```
Query
    RowRange:
        skip:0, take:Infinite
    From:
        Identifier([Adventure Works])
    Dimensions:
        Identifier([Customer].[Customer Geography].[Country])
        Identifier([Customer].[Customer Geography].[State-Province])
        Identifier([Customer].[Customer Geography].[City])
    Measures:
    Filter:
        (null)
    Sort:
```

The query constructor component 116 and/or the query executor component 126 can translate the cube expression into a language supported for querying the cube 104. The data provider component 128 can then provide Table 1 to the client computing device 108 for display.

Example 3

Add a Measure

The following query can be presented by a user or program:

```
AddMeasure(
    ExpandDimension(
        AddDimension(emptyFactTable, "Customer Geography",
    #"Customer Geography"),
        {"Country", "State-Province", "City"}),
    "Internet Sales Amount",
    #"Internet Sales Amount")
```

The query constructor component 116 can lower such query into the following:

```
Table.AddColumn(
    Table.ExpandTableColumn(
        Table.SelectRows(
            Table.NestedJoin(
                emptyFactTable,
                { },
                #"Customer Geography",
                { },
                "Customer Geography"),
            (row) => FactRowsExist([#"Customer Geography" =
    row[Customer Geography])),
        {"Country", "State-Province","City"}),
    "Internet Sales Amount",
    (row) => ApplyMeasure(
        #"Internet Sales Amount",
        [
            Country = row[Country],
            #"State-Province" = row[State-Province],
            City = row[City]
        ]
    )
)
```

The query constructor component 116 can then convert the expression to have a flat Join as in the previous example:

```
Table.AddColumn(
    Table.SelectRows(
        Table.Join(
            emptyFactTable,
            { },
            #"Customer Geography",
            { }),
        (row) => FactRowsExist([#"Customer Geography" =
    row[Customer Geography])),
        "Internet Sales Amount",
        (row) => ApplyMeasure(
            #"Internet Sales Amount",
            [
                [Country = row[Country],
                #"State-Province"= row[State-Province],
                City = row[City]
            ]
        )
)
```

The query constructor component 116 can then translate the normalized expression into a cube expression:

```
Query
    RowRange:
        skip:0, take:Infinite
    From:
        Identifier([Adventure Works])
    Dimensions:
        Identifier([Customer].[Customer Geography].[Country])
        Identifier([Customer].[Customer Geography].[State-Province])
        Identifier([Customer].[Customer Geography].[City])
    Measures:
        Identifier([Measures].[Internet Sales Amount])
```

-continued

```
Filter:
    (null)
Sort:
```

The query constructor component 116 and/or the query executor component 126 can translate the cube expression into a language and/or syntax corresponding to the cube 104. A table resulting from execution of such query is shown in Table 4.

Example 4

Filters

The following query can be presented by a user or program:

```
Table.SelectRows(
    Table.SelectRows(
        AddMeasure(
            ExpandDimension(
                AddDimension(emptyFT, "Customer Geography",
    #"Customer Geography"),
                {"Country", "State-Province","City"}),
            "Internet Sales Amount",
            #"Internet Sales Amount"),
        (row) => row[City] = "Seattle"),
    (row) => row[Internet Sales Amount] > 500)
```

The query constructor component 116 can lower such query into the following:

```
Table.SelectRows(
    Table.SelectRows(
        Table.AddColumn(
            Table.ExpandTableColumn(
                Table.SelectRows(
                    Table.NestedJoin(
                        emptyFactTable,
                        { },
                        #"Customer Geography",
                        { },
                        "Customer Geography"),
                    (row) => FactRowsExist([#"Customer Geography" =
    row[. . .]])),
                {"Country", "State-Province","City"}),
            #"Internet Sales Amount",
            (row) => ApplyMeasure(
                #"Internet Sales Amount",
                [
                    Country = row[Country],
                    #"State-Province" = row[State-Province],
                    City = row[City]
                ]
            )
        ),
        (row) => row[City] = "Seattle"),
    (row) => row[Internet Sales Amount] > 500)
```

The query constructor component 116 can then normalize the expression above, to have a flat join. The query constructor component 116 can also push the "row" filter for the City dimension attribute below the join with the "Customer Geography" dimension table, as shown here:

```
Table.SelectRows(
    Table.AddColumn(
        Table.SelectRows(
            Table.Join(
```

```
                emptyFactTable,
                { },
                Table.SelectRows(
                    #"Customer Geography",
                    (row) => row[City] = "Seattle"),
                { }),
            (row) => FactRowsExist([#"Customer Geography" =
row[Customer Geography])),
            "Internet Sales Amount",
            (row) => ApplyMeasure(
                #"Internet Sales Amount",
                [
                    Country = row[Country],
                    #"State-Province" = row[State-Province],
                    City = row[City]
                ]
            )
        ),
        (row) => row[Internet Sales Amount] > 500)
```

The query constructor component 116 may then translate the normalized expression into a cube expression:

```
Query
    RowRange:
        skip:0, take:Infinite
    From:
        Identifier([Adventure Works])
    Dimensions:
        Identifier([Customer].[Customer Geography].[Country])
        Identifier([Customer].[Customer Geography].[State-Province])
        Identifier([Customer].[Customer Geography].[City])
    Measures:
        Identifier([Measures].[Internet Sales Amount])
    Filter:
    And
        Equals
            IdentifieraCustomer].[Customer Geography].[City])
            Constant(Seattle)
        GreaterThanOrEquals
            Identifier([Measures].[Internet Sales Amount])
            Constant(500)
    Sort:
```

The query constructor component 116 and/or the query executor component 126 can translate the above expression into a language and/or syntax that can be used to query over the cube 104. Executing this query can result in obtainment of the following table:

TABLE 9

| Customer Geography.Country | Customer Geography.State-Province | Customer Geography.City | Internet Sales Amount |
|---|---|---|---|
| 1 United States | Washington | Seattle | 75164 |

Example 5

Collapse

The following query can be presented by a user or program:

```
CollapseDimension(
    Table.SelectRows(
        AddMeasure(
            ExpandDimension(
                AddDimension(emptyFT, "Customer Geography",
```

```
        #"Customer Geography"),
            {"Country", "State-Province","City"}),
        "Internet Sales Amount",
        #"Internet Sales Amount"),
    (row) =>row[City]="Seattle"),
{"City", "State-Province"})
```

It is to be noted that the measure filter present in previous examples herein has been omitted for sake of brevity. The query constructor component 116 can lower this query into the following:

```
Table.AddColumn(
    Table.Group(
        Table.RemoveColumns(
            Table.SelectRows(
                Table.AddColumn(
                    Table.ExpandTableColumn(
                        Table.SelectRows(
                            Table.NestedJoin(
                                emptyFactTable,
                                { },
                                #"Customer Geography",
                                { },
                                #"Customer Geography"),
                            (row) => FactRowsExist([#"Customer Geography" =
                                row[. . .])),
                        {"Country", "State-Province","City"]),
                    "Internet Sales Amount",
                    (row) => ApplyMeasure(
                        #"Internet Sales Amount",
                        [
                            Country = row[Country],
                            #"State-Province" = row[State-Province],
                            City = row[City]
                        ])
                    ),
                (row) => row[City] = "Seattle"),
            {"Internet Sales Amount"}),
        {"Country"},
        {
            {"City", (rows) => rows[City]},
            {"State", (rows) => rows[State]}
        }),
    "Internet Sales Amount",
    (row) => ApplyMeasure(
        #"Internet Sales Amount",
        [
            Country = row[Country]
        ])
)
```

The addition of the operations to "float" the measure are to be noted, since the dimensionality of the table is changing. Further, it can be noted that the measure application has been adjusted to rely on the new set of dimensions (Country). It can further be noted that the Group operation is employed, which groups by the remaining dimension attributes that are not being collapsed. First, the ExpandTableColumn(NestedJoin) is replaced with a flat Join as in previous examples:

```
Table.AddColumn(
    Table.Group(
        Table.RemoveColumns(
            Table.SelectRows(
                Table.AddColumn(
                    Table.SelectRows(
                        Table.Join(
                            emptyFactTable,
                            { },
                            #"Customer Geography",
                            { }),
                        (row) => FactRowsExist([#"Customer Geography" =
```

```
                            row[. . .])),
                    ),
                    "Internet Sales Amount",
                    (row) => ApplyMeasure(
                        #"Internet Sales Amount",
                        [
                            Country = row[Country],
                            #"State-Province" = row[State-Province],
                            City = row[City]
                        ])
                    ),
                (row) => row[City] = "Seattle"),
            {"Internet Sales Amount"}),
        {"Country"},
        {
            {"City", (rows) => rows[City]},
            {"State", (rows) => rows[State]}
        }),
    "Internet Sales Amount",
    (row) => ApplyMeasure(
        #"Internet Sales Amount",
        [
            Country = row[Country]
        ])
)
```

The filter against the City dimension is pushed down to the dimension table:

```
Table.AddColumn(
    Table.Group(
        Table.RemoveColumns(
            Table.AddColumn(
                Table.SelectRows(
                    Table.Join(
                        emptyFactTable,
                        { },
                        Table.SelectRows(
                            #"Customer Geography",
                            (row) => row[City] = "Seattle"),
                        { }),
                    (row) => FactRowsExist([#"Customer Geography" =
                        row[. . .])),
                ),
                "Internet Sales Amount",
                (row) => ApplyMeasure(
                    #"Internet Sales Amount",
                    [
                        Country = row[Country],
                        #"State-Province" = row[State-Province],
                        City = row[City]
                    ])
                ),
            {"Internet Sales Amount"}),
        {"Country"},
        {
            {"City", (rows) => rows[City]},
            {"State", (rows) => rows[State]}
        }),
    "Internet Sales Amount",
    (row) => ApplyMeasure(
        #"Internet Sales Amount",
        [
            Country = row[Country]
        ])
)
```

The RemoveColumns(AddColumn) pair is also eliminated since the removed column is no longer necessary. It can be noted that this is a key part of the "floating" of measures and makes this query efficient to evaluate after normalization:

```
Table.AddColumn(
    Table.Group(
        Table.SelectRows(
            Table.Join(
                emptyFactTable,
```

```
    { },
    Table.SelectRows(
        #"Customer Geography",
        (row) => row[City] = "Seattle"),
    { }),
    (row) => FactRowsExist([#"Customer
    Geography" = row[. . .]])),
    {"County"},
    {
        {"City", (rows) => rows[City]},
        {"State", (rows) => rows[State]}
    }),
    "Internet Sales Amount",
    (row) => ApplyMeasure(
        #"Internet Sales Amount",
        [
            Country = row[Country]
        ])
)
```

Finally, the query constructor component 116 can normalize the Group(Join) combination into a NestedJoin:

```
Table.AddColumn(
    Table.SelectRows(
        Table.NestedJoin(
            emptyFactTable,
            { },
            Table.SelectRows(
                #"Customer Geography",
                (row) => row[City] = "Seattle"),
            { },
            "Customer Geography"),
        (row) => FactRowsExist([#"Customer Geography" =
row[. . .]])),
    "Internet Sales Amount",
    (row) => ApplyMeasure(
        #"Internet Sales Amount",
        [
            Country = row[Country]
        ])
)
```

The query constructor component 116 can then translate the expression into a cube expression:

```
Query
    RowRange:
        skip:0, take:Infinite
    From:
        Identifier([Adventure Works])
    Dimensions:
        Identifier([Customer].[Customer Geography].[Country])
    Measures:
        Identifier([Measures].[Internet Sales Amount])
    Filter:
        Equals
        Identifier([Customer].[Customer Geography].[City])
        Constant(Seattle)
    Sort:
```

The query constructor component 116 and/or the query executor component 126 can translate the query into a language and/or syntax that can be used to execute queries over the cube 104. The following table can be retrieved based upon the query:

TABLE 10

| | Customer Geography.Country | Internet Sales Amount |
|---|---|---|
| 1 | United States | 75165 |

Figure 2:
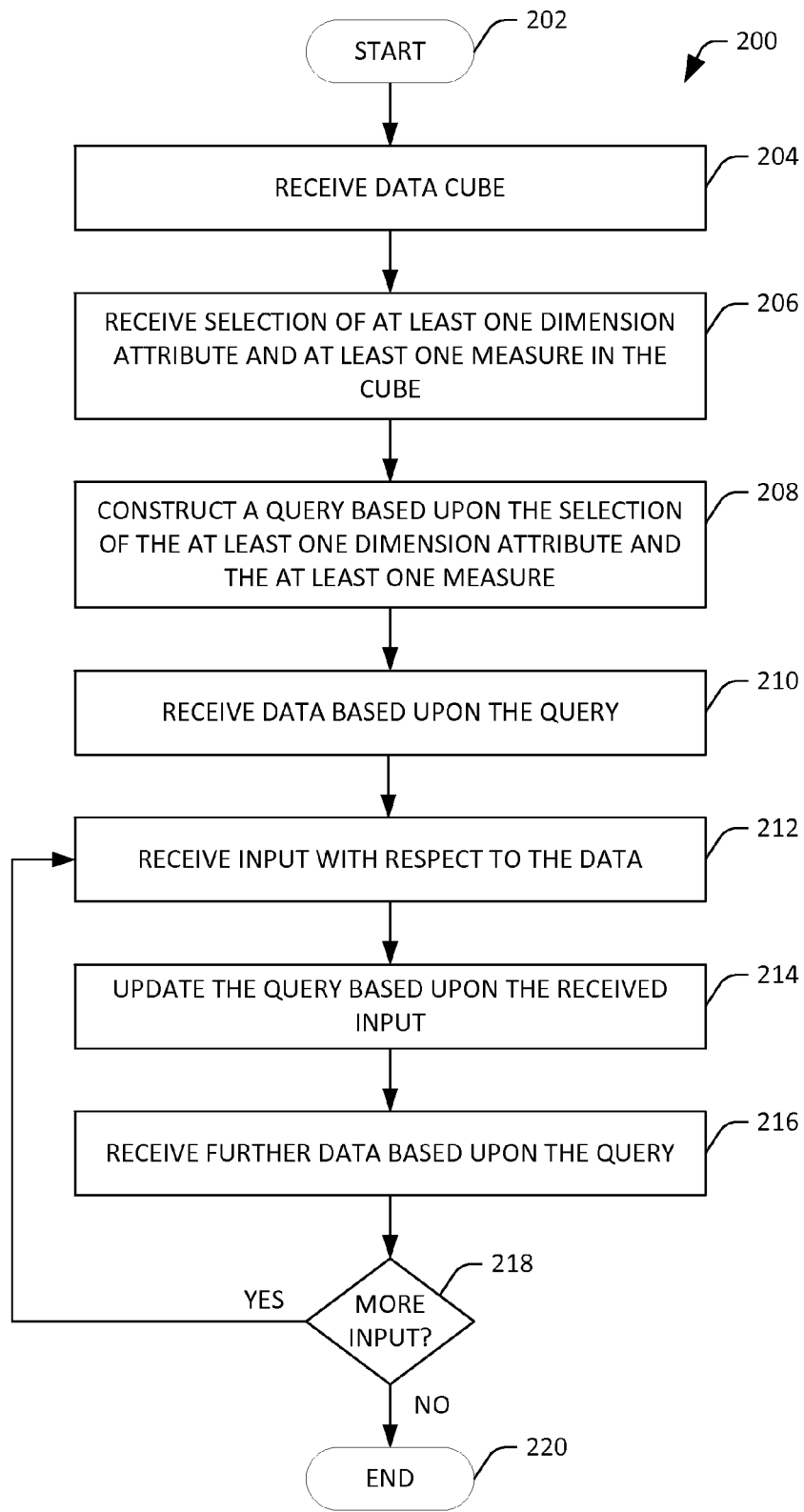
FIG. 2 is a flow diagram illustrating an exemplary methodology for constructing a query for execution over a multidimensional data structure.
Figure 3:
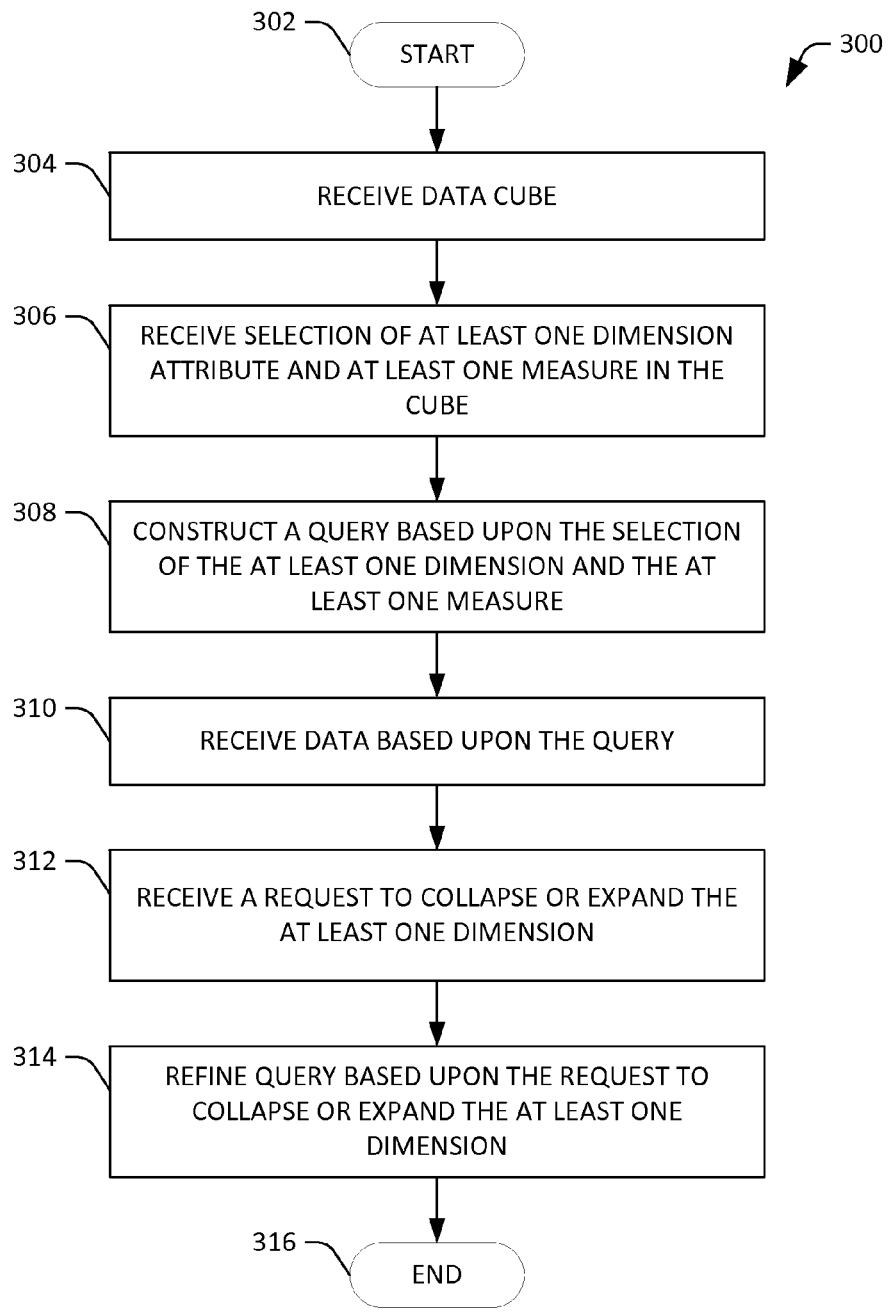
FIG. 3 is a flow diagram illustrating an exemplary methodology for refining a query based upon a request to collapse or expand attributes of at least one dimension of a multidimensional data structure.
Figure 4:
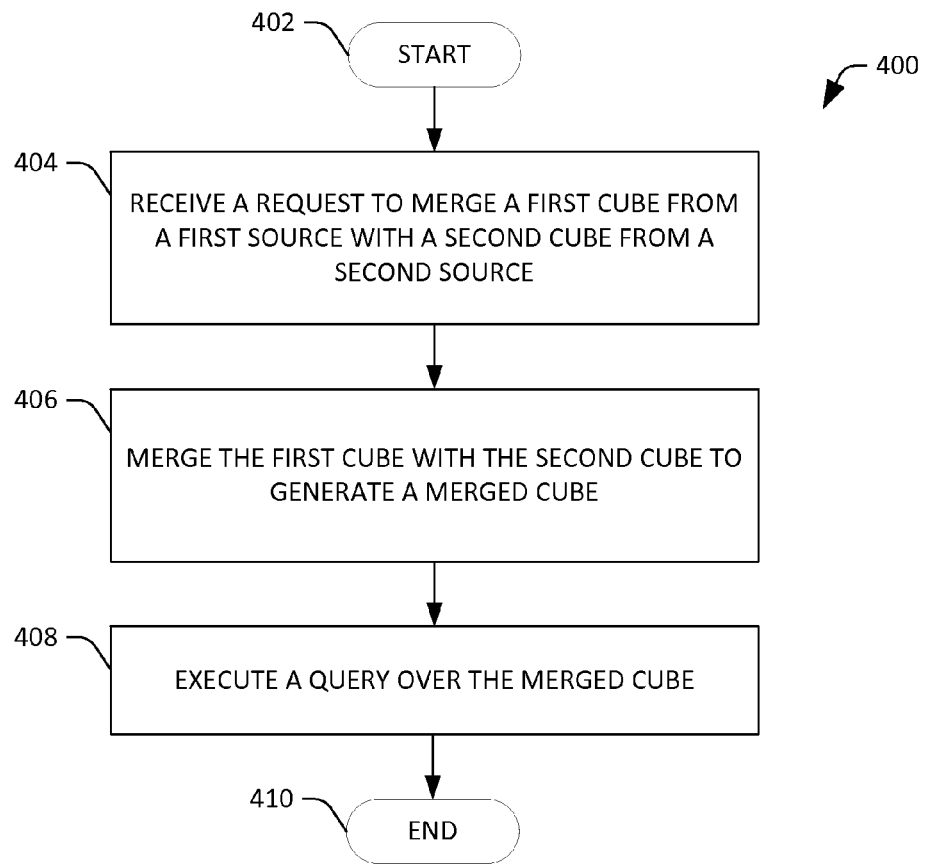
FIG. 4 is a flow diagram that illustrates an exemplary methodology for merging at least two multidimensional data structures to create a merged data structure.

FIGS. 2-4 illustrate exemplary methodologies relating to construction of a query for execution over a cube. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

With reference now to FIG. 2, a flow diagram illustrating an exemplary methodology 200 for constructing a query that can be executed over a cube is illustrated. The methodology 200 starts at 202, and at 204 a cube is received. At 206, a selection of at least one dimension attribute and at least one measure in the cube is received. In an example, the cube can include data that identifies sales by location and time. In such an example, sales is the measure and location and time are the dimensions. Attributes of the location dimension can be city, state, and country, while attributes of the time dimension may be weeks, months, and years.

At 208, a query is constructed based upon the selection of the at least one dimension attribute and the at least one measure. In an example, if the selection was for the location dimension attribute "city", and the selected measure is "sales", the constructed query can be configured to retrieve sales by city from the cube.

At 210, data is received based upon the query. Specifically, the query is executed over the cube, and data generated based upon the execution of the query over the cube is received. The data may be presented to a user in tabular form on a display of a computing device. At 212, input is received with respect to the presented data. Such input may be a request to filter the presented data based upon a particular attribute value, collapsing of a dimension attribute, expanding of a dimension attribute, adding a dimension attribute, adding a measure, etc. Examples of this type of user input are now set forth. Continuing with the example where the user has acquired sales numbers by the dimension attribute "city", the user may wish to be provided with sales numbers from cities that start with the letter "A". The input, thus, can be a request to filter cities based upon the input letter "A". In another example, to collapse the dimension attribute "location", the user may wish to be provided with sales numbers by state, rather than by city. The input received at 212, thus, may be a request to collapse the dimension attribute "location" from "city" to "state." In yet another example, to expand the dimension attribute "location", the user may wish to be provided with sales numbers by voting ward, rather than by city. The input received at 212 may therefore be a request to expand the dimension attribute "location" from "city" to "voting ward." In still yet another example, the user may wish to be provided with profit information together with sales data. The user may request that profit be returned, such that the user is provided with both sales by city and profit by city. This is an example of adding a measure. Additionally or alternatively, the user may wish to remove a measure.

At 214, the query is updated based upon the input received at 212. At 216, further data is received based upon the query updated at 214. That is, the updated query is executed over the cube and results of such execution are received and presented to the user on the display screen. Therefore, the user constructs the query by viewing data and identifying at least one operation to be performed over the data. This process can continue until data desired by the user is acquired. At 218, a determination is made regarding whether the user is providing additional input. If the user provides additional input, the method returns to 212, otherwise the method completes at 220.

Now referring to FIG. 3, an exemplary methodology 300 that facilitates constructing a query for execution over a cube is illustrated. The methodology 300 starts at 302, and at 304 a cube is received. At 306, selection of at least one dimension attribute (e.g., the attribute "days" for the dimension "time") and at least one measure is received. At 308, a query is constructed based upon the selection of the at least one dimension attribute and the at least one measure. At 310, data is received based upon the query. As described above, the query constructed at 308 can be executed over the cube, resulting in provision of data that can be presented in tabular form on a display. At 312, a request is received to collapse or expand the at least one dimension represented in the tabular data. Collapsing the dimension refers to producing coarser grained coordinates for a coarser attribute, while expanding a dimension refers to production of finer grained coordinates for a more granular attribute. At 314, the query is refined based upon the request to collapse or expand the at least one dimension.

Additionally, computation of the at least one measure is "floated" in the query, e.g., so that the measure is not computed until after the attribute values for the appropriate dimension attributes are retrieved. This occurs automatically, despite the fact that the user, in a previous stage of query construction, requested that the measure be computed (e.g., prior to requesting the expanding or collapsing of the dimension attribute). Floating of the measure computation can be undertaken by identifying a request for a measure computation, and moving the measure computation command in the query to a position such that measure computation occurs after a dimension attribute is identified.

It is to be noted that this act is different from, for example, adding commands to the end of the query. For instance, an initial exemplary query may have the following form: DIMENSION=TIME; ATTRIBUTE=DAYS; MEASURE=SALES. Data retrieved based upon such query can be sales per day. When the query is reformulated, the query may have the form: DIMENSION=TIME; ATTRIBUTE=DAYS; ATTRIBUTE=WEEKS; MEASURE=SALES. Thus, the selection of the attribute is placed prior to the measure computation command—the measure computation is "floated". Again, this is in contrast to appending the attribute selection to the end of the query, as follows: DIMENSION=TIME; ATTRIBUTE=DAYS; MEASURE=SALES; ATTRIBUTE=WEEKS. The methodology 300 completes at 316.

Now referring to FIG. 4, an exemplary methodology 400 that facilitates merging cubes is illustrated. The methodology 400 starts at 402, and at 404 a request to merge a first cube from a first source (optionally of a first format) with a second cube from a second source (and optionally of a second format) is received. At 406, the first cube is merged with the second cube to generate a merged cube. At 408, a query is executed over the merged cube. Thus, cubes from different data sources can be merged and a single query can be executed over the merged cube. The methodology 400 completes at 410.

Figure 5:
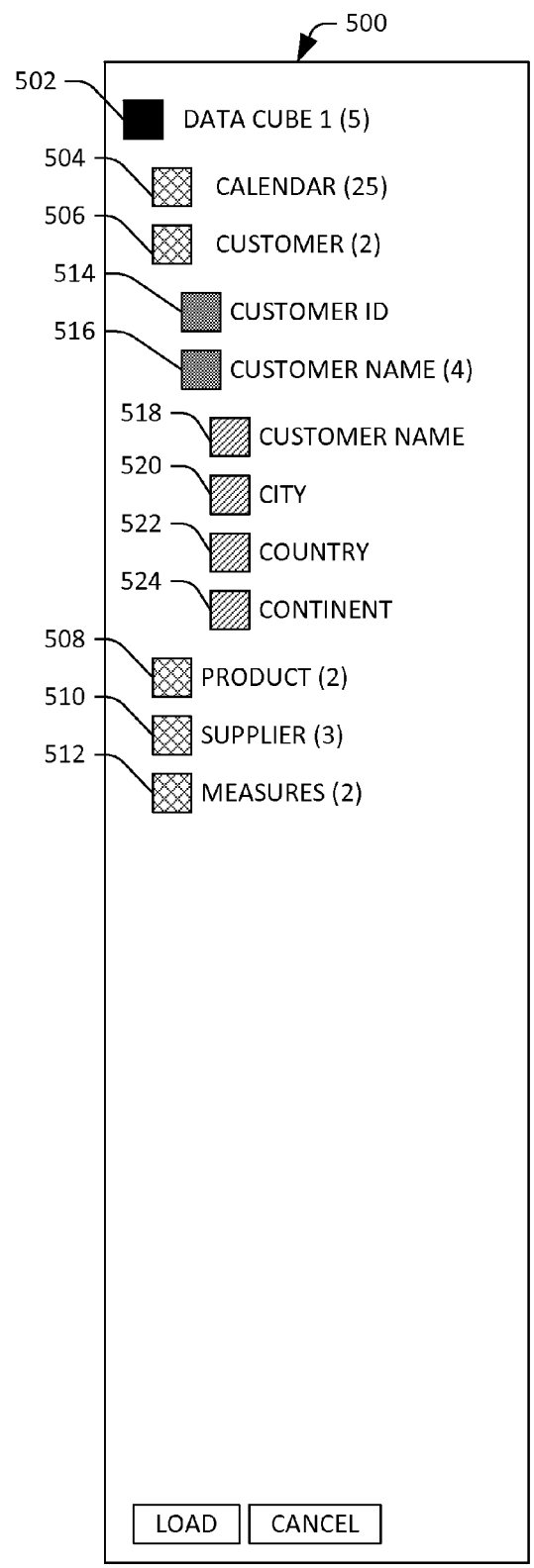

With reference now to FIG. 5, an exemplary graphical user interface 500 that facilitates construction of a query to be executed over a cube is illustrated. The graphical user interface 500 comprises a graphical icon 502 that is representative of a cube (e.g., the cube 104). Responsive to the graphical icon 502 being selected, a plurality of icons 504-512 can be presented, where the icons 504-512 are representative of objects in the cube represented by the icon 502. In an example, the graphical icon 506 can be representative of objects related to customers of a business. Selection of the graphical icon 506 can cause graphical icons 514 and 516 to be presented, wherein the graphical icons 514 and 516 are representative of dimensions in the cube 104. Selection of the graphical icon 516 can cause a plurality of graphical icons 518-524 to be presented, wherein such graphical icons 518-524 are representative of respective attributes of the dimension represented by the icon 516. Numerals shown in correspondence with the icons in the graphical user interface 500 can indicate to a user a number of objects beneath the icon. For instance, the dimension represented by the icon 516 has four attributes, and the number (4) is denoted in graphical relation to the icon 516. The user 110 can navigate through the objects and select dimension attributes and measures of the cube 104 that are of interest to the user 110.

Figure 6:
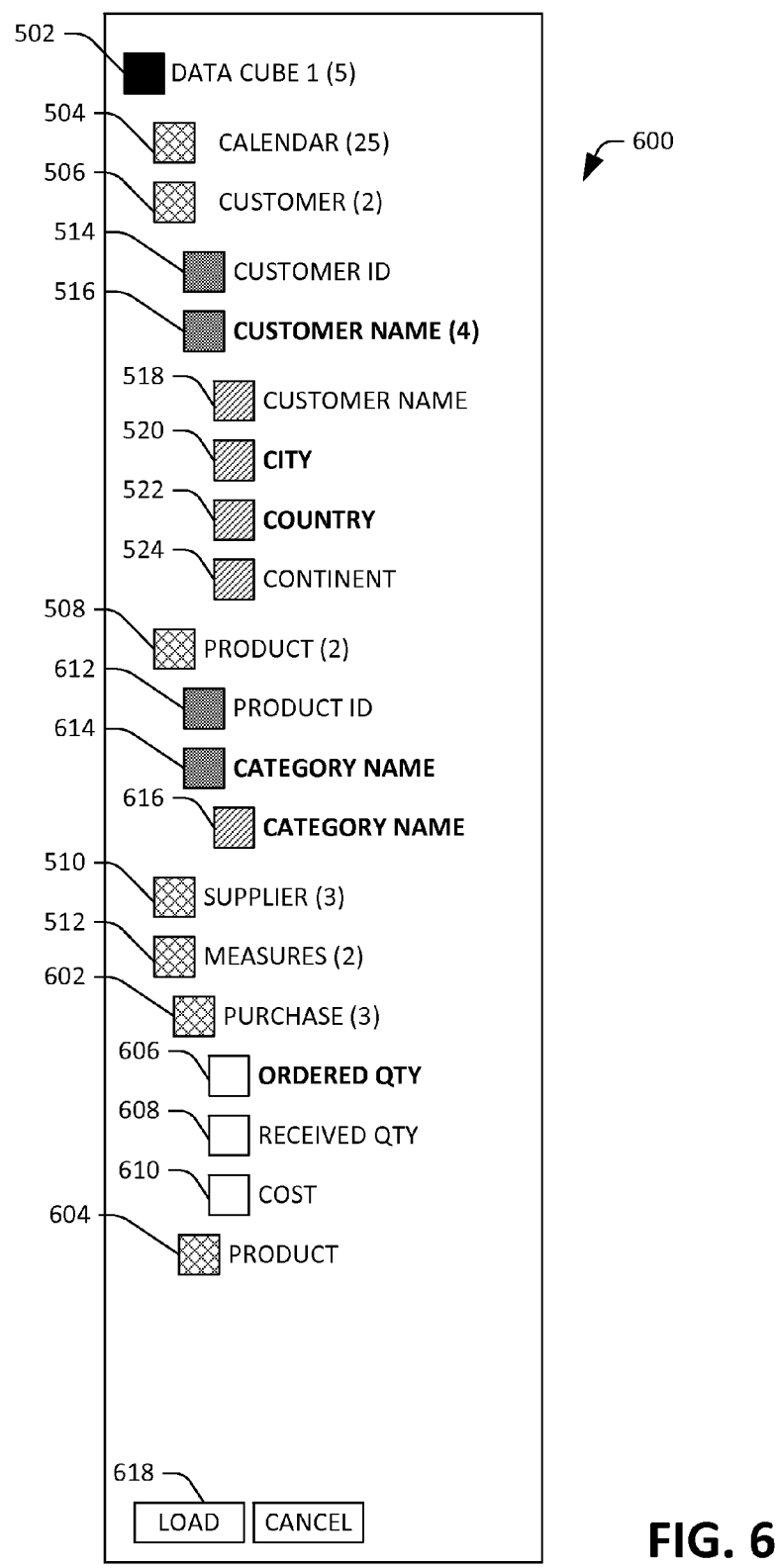

Now referring to FIG. 6, another exemplary graphical user interface 600 is illustrated, wherein the graphical user interface 600 depicts selection of certain dimension attributes and measures by the user 110. Responsive to receipt of a selection of the icon 512, a plurality icons 602 and 604 are shown, which identify two groupings of measures (measures related to purchases and measures related to products, respectively). Responsive to the icon 602 being selected, a plurality of selectable icons 606-610 are presented, wherein the icons 606-610 are respectively representative of measures. Exemplary measures shown in FIG. 6 under the "purchase" grouping include "ordered quantity", "received quantity", and "cost." Further, responsive to the icon 508 being selected, icons 612 and 614 are presented, and responsive to the icon 614 being selected, the icon 616 is shown. The icons 612 and 614 represent dimensions relating to a product (e.g., "product ID" and "category name"), and the icon 616 represents an attribute "category name" for the dimension "category name" represented by the icon 614.

As shown in the exemplary graphical user interface 600, the icon 606 has been selected, and thus a measure identifying ordered quantities of goods (e.g., "ordered quantity") is selected. Additionally, attributes "city" and "country" of the dimension "customer name" have been selected, and the attribute "category name" of the dimension "category name" has been selected. Once the user 110 has selected desired dimension attributes and measures, the user 110 can select a "load" button 618. The input receiver component 115 (FIG. 1) can receives the selection of the dimension attributes and measures (e.g., responsive to the "load" button 618 being selected), and the query constructor component 116 constructs a query based upon the input received by the input receiver component 115. The server computing device 106 receives the query, and the query executor component 126 executes the query over the cube 104. The data provider component 128 receives data returned based upon the execution of the query over the cube 104, and transmits to the data to the client computing device 108, where it is placed in the memory 112 as the data 117.

Now referring to FIG. 7, an exemplary graphical user interface 700 that includes a worksheet is shown, where the presenter component 120 presents the data 117 retrieved based upon the constructed query in tabular format. The graphical user interface 700 includes tabular data 702 that includes columns for selected respective dimension attributes and rows for measures of values of the dimension attributes. Thus, continuing with the example user selections described above with reference to the graphical user interface 600, the tabular data 702 includes a first column 704 that is representative of the attribute "city" for the dimension "customer name", a second column 706 that is representative of the attribute "country" for the dimension "customer name", and a third column 708 that is representative of the attribute "category name" for the dimension "category name." A fourth column 710 represents the measure "ordered quantity", and values in the fourth column 710 represent ordered quantities of a product having the respective attributes shown in the columns 704, 706, and 708.

Now referring to FIG. 8, an exemplary graphical user interface 800 of a query editor tool that facilitates constructing and editing a query is illustrated. For instance, responsive to being presented with the data in the worksheet shown in FIG. 7, the user 110 may wish to construct a query that causes different data to be presented to the user 110. The graphical user interface 800 includes a field 802 that sets forth a list of steps that have been performed to acquire the data shown in the graphical user interface 700. A field 804 depicts data retrieved from the cube 104 based upon the steps shown in the field 802. For example, the "source" step in the field represents the selection of the cube 104 represented by the icon 502. The step "expand dim 1" shown in the field 802 represents the selection of dimension attributes "city" and "country" of the dimension "customer name." The step "expand dim2" represents the selection of the dimension attribute "category name" of the dimension "category name." As will be described herein, the steps shown in the field 802 are selectable, and data presented in the field 804 alters as different steps are selected.

Now referring to FIG. 9, another exemplary graphical user interface 900 of the query editor tool is shown. In this example, the user 110 has selected the step "expand dim1" from the list of steps depicted in the field 802. Responsive to the step "expand dim1" being selected, the BI application can update contents shown in the field 804, such that attribute values for the dimension attributes "city" and "country" from the dimension "customer name" are shown, but attribute values for the dimension attribute "category name" and measures are not depicted in the field 804.

Now referring to FIG. 10, another exemplary graphical user interface 1000 of the query editor tool is shown. Here, the user 110 has selected the third step ("expand dim2") used to construct the query from the field 802, and contents of the field 804 are updated to present data when the query is constructed based upon the first three steps (but not the "add measure1" step). That is, the query constructor component 116 constructs the query based upon the first three steps, and the query executor component 126 executes such query over the cube 104. As the third step relates to expanding the category name, the third column 708 is presented. FIGS. 9 and 10 have been presented to illustrate that the user 110, when constructing and/or editing a query through the stepwise approach described herein, can go backwards to insert a new query step, modify a previously performed query step, etc.

With reference now to FIG. 11, another exemplary graphical user interface 1100 of the query editor tool is presented, wherein the user 110 has selected the query construction step "add measure1", which represents selection of the measure "ordered quantity". The contents of the field 804 are updated responsive to the aforementioned step being selected to present measure values for the attribute values of the dimension attributes. Again, the user may insert query construction steps between the steps shown in the field 802, may delete query construction steps from the steps shown in the field 802, add query construction steps after the last query construction step shown in the field 802, etc.

Now referring to FIG. 12, an exemplary graphical user interface 1200 that can be used to set forth a text-based version of the query constructed by way of the query editor tool is displayed. By editing text shown in FIG. 12, the user 110 may choose to modify the constructed query by way of inserting text, removing text, etc. The text-based editor may be particularly well-suited for users who are familiar with the query language employed by the business intelligence application 112.

Figure 13:
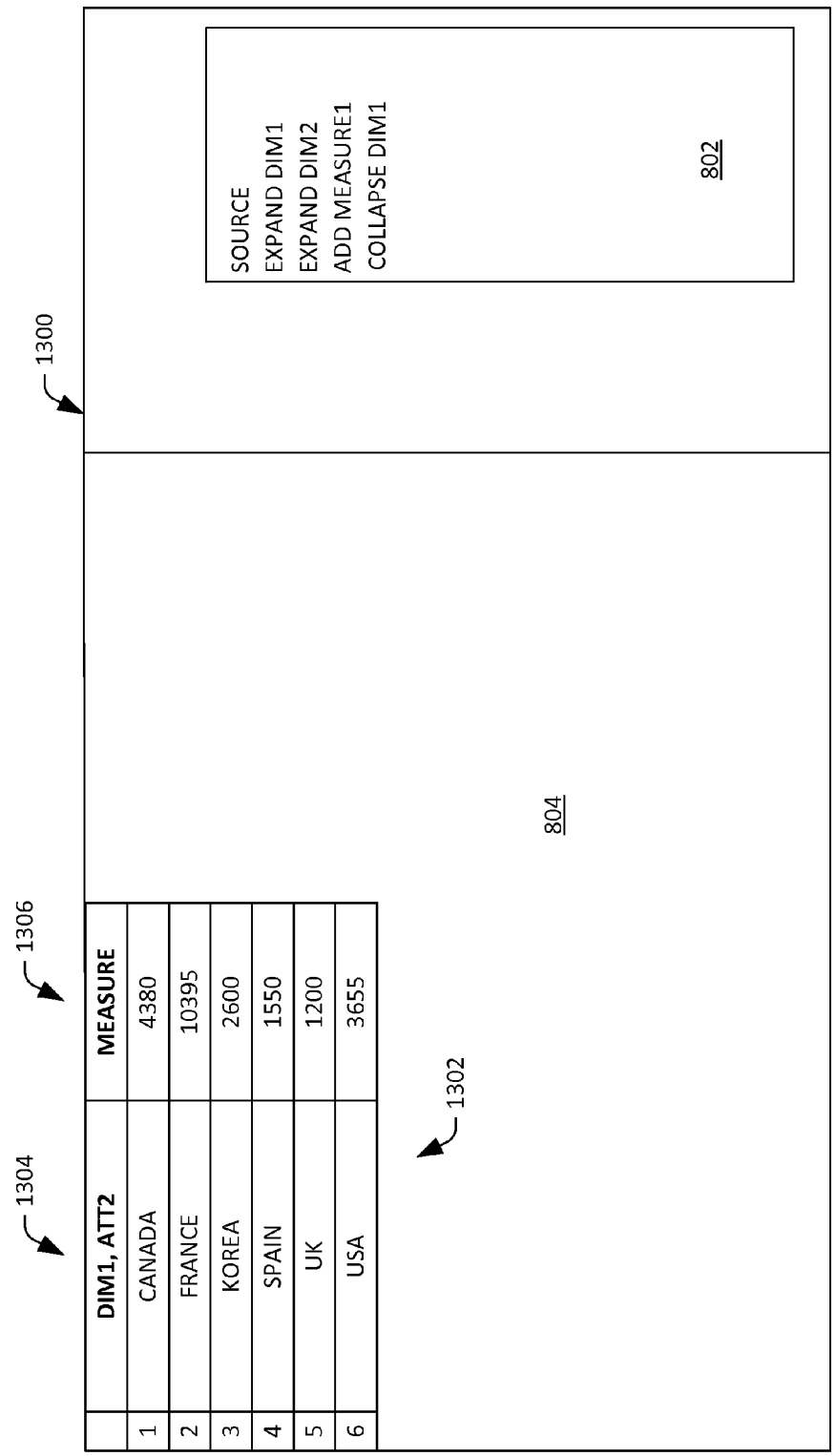

With reference now to FIG. 13, an exemplary graphical user interface 1300 that illustrates collapsing of a dimension attribute is depicted. As shown in FIG. 11, the measure "order quantity" was computed with respect to the dimension "customer name" for the dimension attributes "city" and "country", where the dimension attribute "city" is more granular than the dimension attribute "country". Returning to FIG. 13, collapsing the dimension from "city" to "country" causes the values of the measure "ordered quantity" to be rolled up to the dimension attribute "country". This is represented by the "collapse dim1" step in the field 802.

Construction of a query using the step-by-step approach described herein when dimension attributes are collapsed or expanded is a non-trivial process, as a function for collapsing or expanding dimension attributes cannot be applied in sequence with previous query construction steps. The query constructor component 116 constructs the query, as described above, by "floating" the computation of the measure to the back of the query expression. There is no analog to this approach in a relational database setting. That is, removing columns from a table in a relational database setting does not cause rows to be removed.

Continuing with this example, the query constructor component 116 constructs the query (before the "collapse dim1" step) by first defining a first expression that retrieves the identified dimension attributes, and then defining a second expression that computes the identified measure for attribute values of the identified dimension attributes. If the query constructor component 116 attempted to define a third expression that collapses an attribute dimension, where the third function executes after the first and second functions (e.g., mapping to the order of the steps in the field 802), the measure would still be computed over the finer-grained dimension attribute ("city"), rather than over the desired (coarser) dimension attribute "country". In the case of collapses and expansions, instead of linearly adding expressions, the expression for computing the measure is floated to the exterior of the query, such that the expression is executed after the desired attribute dimensions have been identified. The resultant table 1302 shown in the field 804 includes two columns; a first column 1304 corresponding to the dimension attribute "country" for the dimension "customer name", and a second column 1306 that identifies measure values computed for the attribute values shown in the first column 1304.

Figure 14:
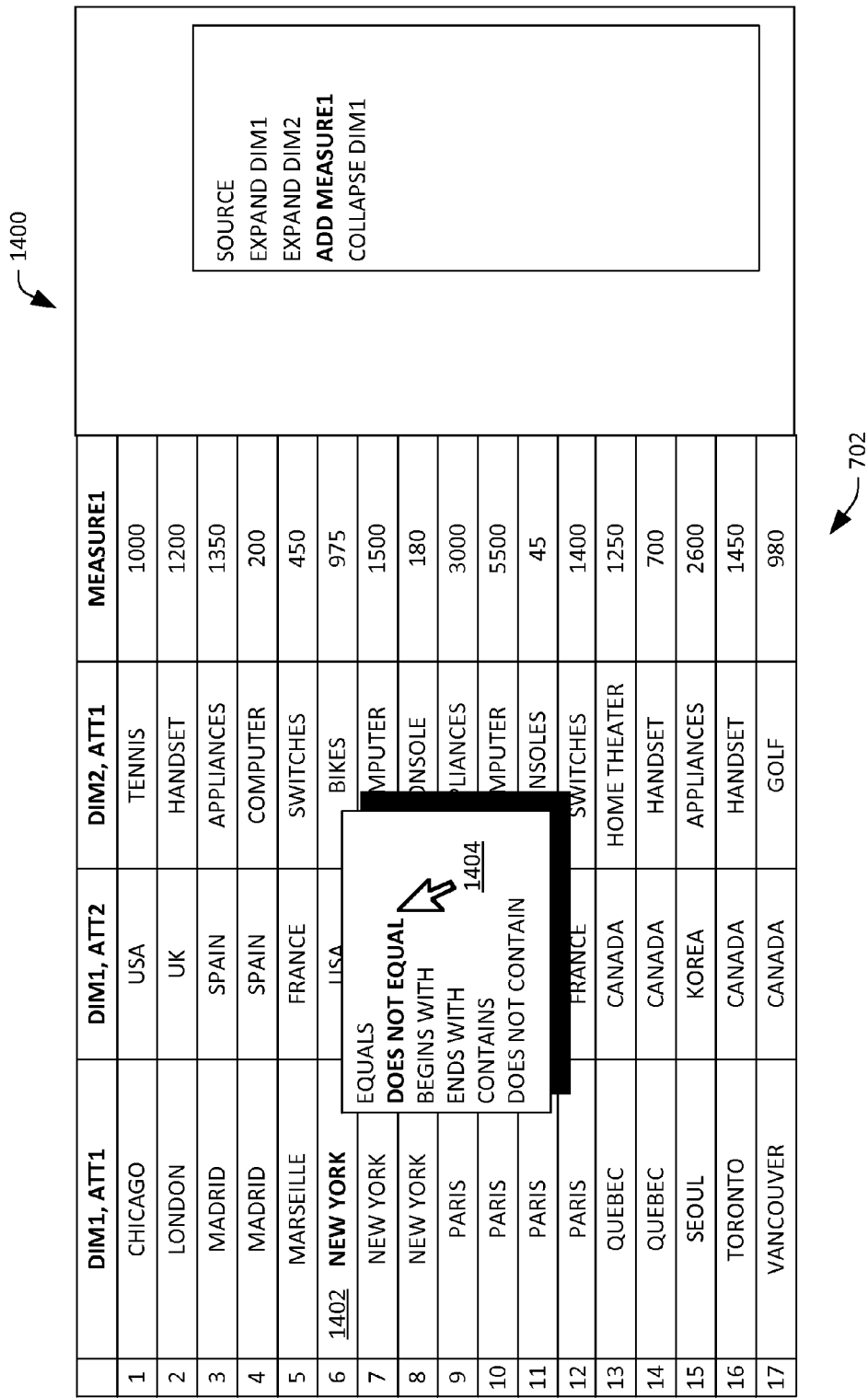

With reference to FIG. 14, another exemplary graphical user interface 1400 is presented. It can be ascertained that the user 110 has selected a previous query construction step in the field 802 (e.g., the "add measure1" step). Thus, for example, the user 110 may wish to modify the query prior to the query causing the dimension attribute "city" from being collapsed into the dimension attribute "country". For example, the user 110 may select a particular cell 1402 that has a first value in the first column 704, which can cause a pop-up window 1404 to be presented to the user 110. The pop-up window 1404 can include selectable options for filtering results from the tabular data 702. For example, the user 110 may indicate that she wishes to filter any rows in the tabular data 702 having the first value from the tabular data 702. In another example, the user 110 may indicate that she wishes only to be provided with rows in the tabular data 702 that have the first value, amongst other filter options. The filter operation selected by the user 110 from the popup window 1404 may then be added as a step in the query construction process in the field 802, and can be presented immediately subsequent to the selected step (e.g., after the "add measure1" step, but prior to the "collapse dim1" step). The query constructor component 116, responsive to the input receiver component 114 receiving the indication that the user 110 has selected the filter, can update the constructed query.

Figure 15:
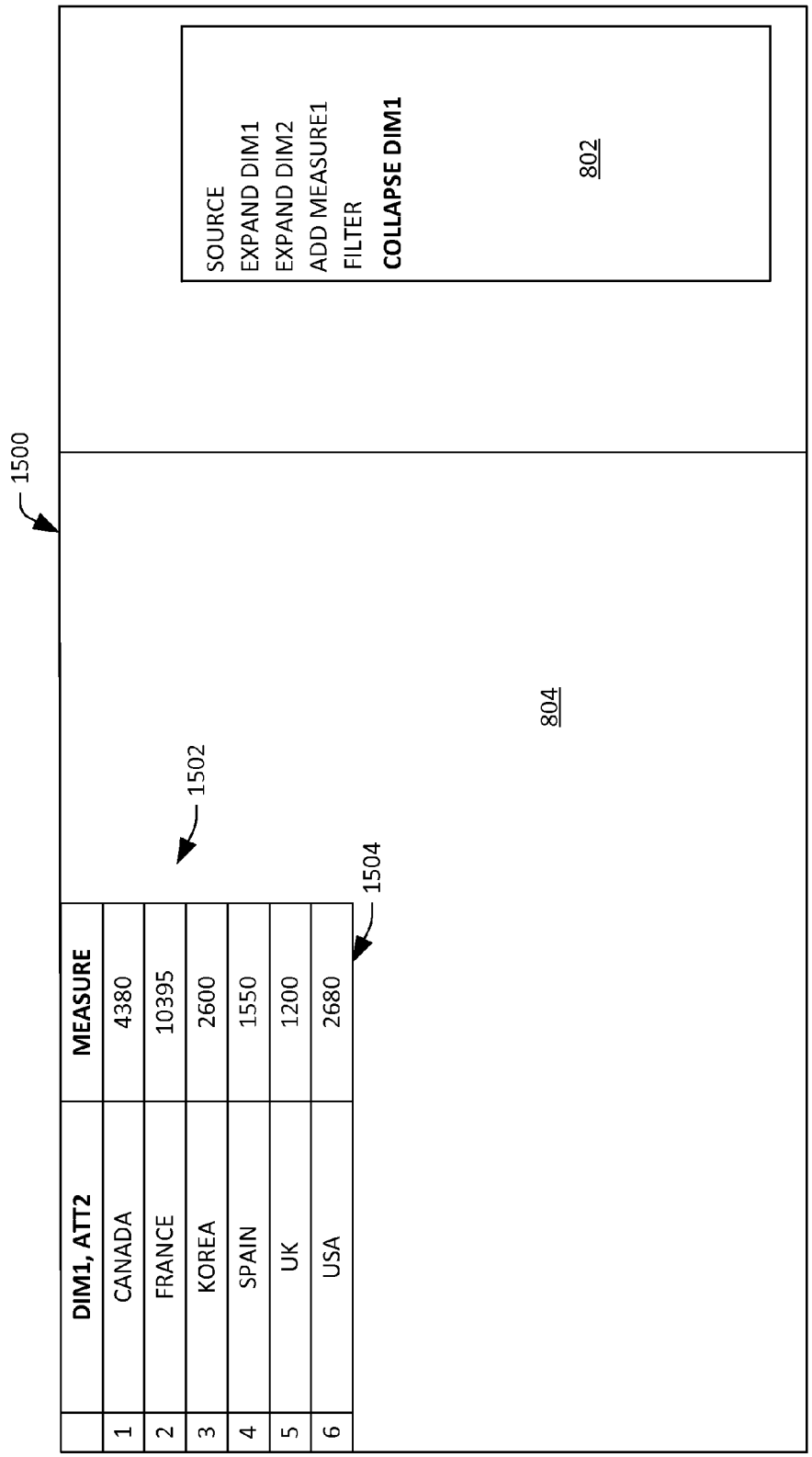

Referring to FIG. 15, the user 110 may then select the last step in the query steps shown in the field 802 (e.g., the "collapse dim1" step), which can cause the query constructor component 116 to transmit the refined query to the query executor component 126, which executes the refined query over the cube 104. The data provider component 128 returns the data 117, which is retained in the memory 112 of the client computing device 108. The presenter component 120 presents the data 117 in tabular format in the field 804, wherein tabular data 1502 illustrates data returned by executing the query. For example, a value in a cell 1504 has been updated (when compared to the corresponding value in the cell shown in FIG. 13) due to the filtering step being included in the query.

Referring to FIG. 16, another exemplary graphical user interface 1600 of a text-based query editor tool is shown. The graphical user interface 1600 depicts a textual representation of the query constructed in the manner set forth above.

Various examples are now set forth.

Example 1

A computing system comprising: a processor; and a memory that comprises a business intelligence (BI) application that is executed by the processor, the BI application is configured to: construct a query based upon incremental modifications to previous versions of the query, the query represented as a sequence of query steps, each step in the sequence of query steps corresponds to a respective incremental modification in the incremental modifications; and retrieve tabular data from a data cube based upon the query.

Example 2

The computing system according to example 1, the BI application comprises a query constructor component that receives an incremental modification and constructs the query based upon: the incremental modification and a sequence of previously received incremental modifications, wherein the query constructor component expresses the query as a plurality of relational operators.

Example 3

The computing system according to example 2, the query constructor component normalizes the plurality of operators to predefined expression tree patterns.

Example 4

The computing system according to example 1, the BI application comprises a query constructor component that receives an incremental modification to the query, the incremental modification to the query being a request to one of expand a dimension in the cube or collapse the dimension in the cube, the query constructor component constructs the query based upon the incremental modification.

Example 5

The computing system according to example 4, the query comprises a second incremental modification, the second incremental modification being a request to compute a measure for a dimension, the query constructor component constructs the query such that the measure is computed subsequent to an attribute of the dimension being selected.

Example 6

The computing system according to example 5, the second incremental modification occurring prior to the incremental modification.

Example 7

The computing system according to any of examples 1-6, further comprising a presenter component that presents the tabular data retrieved from the data cube on a display, the presenter component further presents the query on the display.

Example 8

The computing system according to example 7, the presenter component presents the sequence of query steps on the display.

Example 9

The computing system according to example 8, the BI application comprises an input receiver component that receives a selection of a previous query step in the query steps, wherein responsive to the input receiver component receiving the selection, the presenter component presents second tabular data from the data cube on the display, the second tabular data retrieved based upon the query at the previous step in the query steps.

Example 10

The computing system according to example 9, the input receiver component receives an intermediate incremental modification subsequent to the input receiver component receiving the selection of the previous query step, the query constructor component constructs the query to add another query step subsequent to the previous query step and prior to a last query step in the sequence of query steps.

Example 11

The computing system according to any of examples 1-10 comprised by a server computing device that is accessible by way of a web browser.

Example 12

A method executed by a computer processor, the method comprises: presenting tabular data on a display, the tabular data retrieved from a data cube based upon a previously issued query step; receiving a subsequent query step; constructing a query based upon the previously issued query step and the subsequent query step; retrieving updated tabular data from the data cube based upon the query; and presenting the updated tabular data on the display responsive to retrieving the updated tabular data.

Example 13

The method according to example 12, the previously issued query step causes a measure to be computed over a first attribute of a dimension, and the subsequent query step causes the measure to be computed over a second attribute of the dimension.

Example 14

The method according to example 13, further comprising: responsive to receiving the subsequent query step, constructing the query such that the measure is computed over the second attribute of the dimension after the second attribute of the dimension is specified in the query.

Example 15

The method according to any of examples 12-14, further comprising presenting a sequence of query steps on the display, the sequence of query steps comprising the previously issued query step and the subsequent query step, each query step in the sequence of query steps being selectable.

Example 16

The method according to example 15, further comprising: receiving a selection of a query step in the sequence of query steps; constructing the query based upon the selection of the query step in the sequence of query steps; and presenting tabular data that corresponds to the query up to the selected query step.

Example 17

The method according to any of examples 12-16, the subsequent query step being a request to collapse or expand at least one dimension, the method comprising refining the query based upon the request to collapse or expand the at least one dimension.

Example 18

The method according to any of examples 12-17, wherein constructing the query comprises: transforming the previous query step and the subsequent query step into a plurality of relational operators; and normalizing the plurality of relational operators based upon a predefined pattern.

Example 19

The method according to any of examples 12-18, further comprising: receiving multiple incremental modifications to the query; and for each incremental modification: constructing the query; and retrieving tabular data based upon a respective incremental modification.

Example 20

A computer-readable storage medium comprising instructions that, when executed by a processor, cause the processor to perform acts comprising: receiving a query; responsive to receiving the query, retrieving tabular data from a data cube; responsive to retrieving the tabular data from the data cube, presenting the tabular data and a sequence of query steps on a display, the sequence of query steps representative of the query, the tabular data comprises a computed measure over a first attribute of a dimension in the data cube; receiving an incremental modification to the query, the incremental modification being a request to compute the measure over a second attribute of the dimension in the data cube; and responsive to receiving the incremental modification to the query, retrieving second tabular data based upon the incremental modification to the query, the second tabular data comprises the measure computed over the second attribute of the dimension.

Example 21

A computer-implemented system, comprising: means for presenting tabular data on a display, the tabular data retrieved from a data cube based upon a previously issued query step; means for receiving a subsequent query step; means for constructing a query based upon the previously issued query step and the subsequent query step; means for retrieving updated tabular data from the data cube based upon the query; and means for presenting the updated tabular data on the display responsive to retrieving the updated tabular data.

Figure 17:
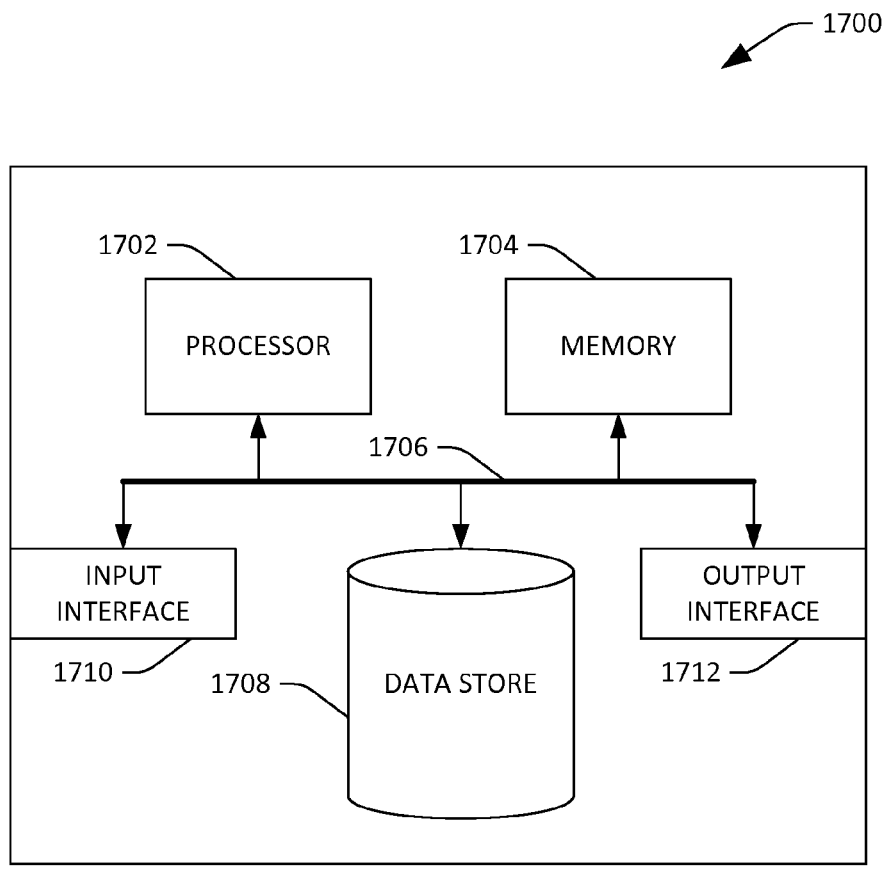
FIG. 17 is an exemplary computing system.

Referring now to FIG. 17, a high-level illustration of an exemplary computing device 1700 that can be used in accordance with the systems and methodologies disclosed herein is illustrated. For instance, the computing device 1700 may be used in a system that supports construction and refining a query for execution over a data cube. By way of another example, the computing device 1700 can be used in a system that supports presentation of data extracted from a cube. The computing device 1700 includes at least one processor 1702 that executes instructions that are stored in a memory 1704. The instructions may be, for instance, instructions for implementing functionality described as being carried out by one or more components discussed above or instructions for implementing one or more of the methods described above. The processor 1702 may access the memory 1704 by way of a system bus 1706. In addition to storing executable instructions, the memory 1704 may also store fact tables, dimension tables, hierarchical information, etc.

The computing device 1700 additionally includes a data store 1708 that is accessible by the processor 1702 by way of the system bus 1706. The data store 1708 may include executable instructions, a cube, a slice of the cube, etc. The computing device 1700 also includes an input interface 1710 that allows external devices to communicate with the computing device 1700. For instance, the input interface 1710 may be used to receive instructions from an external computer device, from a user, etc. The computing device 1700 also includes an output interface 1712 that interfaces the computing device 1700 with one or more external devices. For example, the computing device 1700 may display text, images, etc. by way of the output interface 1712.

It is contemplated that the external devices that communicate with the computing device 1700 via the input interface 1710 and the output interface 1712 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1700 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1700 may be a distributed system. Thus, for instance, several devices may be in communication by way of a network connection and may collectively perform tasks described as being performed by the computing device 1700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing system comprising:
    a processor; and
    memory that comprises an application that is executed by the processor, wherein the processor, when executing the application, is configured to:
        construct a query based upon incremental modifications to previous versions of the query, the query represented as a sequence of query steps on a display, each step in the sequence of query steps corresponds to an incremental modification in the incremental modifications;
        in response to receipt of a selection of an intermediate query step in the sequence of query steps, retrieve tabular data from a data cube and display the tabular data on the display, the tabular data retrieved based upon the query at the intermediate query step;
        receive an incremental modification to the query while the tabular data is displayed;
        modify the query based upon the incremental modification to add another query step to the query, wherein the query step is added subsequent to the intermediate query step and prior to a last query step of the query; and
        retrieve second tabular data from the data cube responsive to modifying the query.

2. The computing system of claim 1, the query is modified based upon the incremental modification and a sequence of previously received incremental modifications, wherein the query is expressed as a plurality of relational operators.

3. The computing system of claim 2, wherein the processor, when executing the application, is further configured to normalize the plurality of relational operators to predefined expression tree patterns.

4. The computing system of claim 1, the incremental modification to the query being a request to one of expand a dimension in the data cube or collapse the dimension in the data cube.

5. The computing system of claim 4, the query comprises a second query step that corresponds to a second incremental modification, the second incremental modification being a request to compute a measure for the dimension, wherein the query is constructed such that the measure is computed subsequent to an attribute of the dimension being selected.

6. The computing system of claim 5, the second query step being prior to the another query step in the query.

7. The computing system of claim 1, the processor, when executing the application, is configured to display the second tabular data on the display responsive to retrieving the second tabular data from the data cube.

8. The computing system of claim 1 comprised by a server computing device that is accessible by way of a web browser.

9. A method executed by a computer processor, the method comprising:
constructing a query based upon incremental modifications to previous versions of the query, the query represented as a sequence of query steps on a display, each step in the sequence of query steps corresponds to an incremental modification in the incremental modifications;
receiving a selection of an intermediate query step in the sequence of query steps;
in response to receipt of the selection and based upon the intermediate query step, retrieving tabular data from a data cube and displaying the tabular data on the display;
receiving an incremental modification to the query while the tabular data is displayed;
modifying the query based upon the incremental modification to add another query step to the query, wherein the query step is added subsequent to the intermediate query step and prior to a last query step of the query; and
retrieving second tabular data from the data cube, the second tabular data retrieved based upon the intermediate query step and the another query step.

10. The method of claim 9, wherein the intermediate query step, when performed by the processor, causes a measure to be computed over a first attribute of a dimension, and the another query step, when performed by the processor, causes the measure to be computed over a second attribute of the dimension.

11. The method of claim 10, further comprising:
responsive to receiving the another query step, modifying the query such that the processor, when executing the query over the data cube, computes the measure over the second attribute of the dimension after the second attribute of the dimension is specified in the query.

12. The method of claim 9, wherein each query step in the sequence of query steps is selectable.

13. The method of claim 9, further comprising retrieving the second tabular data based upon each query step in the query up to the another query step.

14. The method of claim 13, wherein query steps after the another query step in the query are not considered when retrieving the second tabular data.

15. The method of claim 9, the another query step being a request to collapse or expand at least one dimension, the method further comprising refining the query based upon the request to collapse or expand the at least one dimension.

16. The method of claim 9, further comprising:
transforming the incremental query step and the another query step into a plurality of relational operators; and
normalizing the plurality of relational operators based upon a predefined pattern.

17. A computer-readable storage medium comprising instructions that, when executed by a computer processor, cause the computer processor to perform acts comprising:
constructing a query based upon incremental modifications to previous versions of the query, the query represented as a sequence of query steps on a display, each step in the sequence of query steps corresponds to an incremental modification in the incremental modifications;
receiving a selection of an intermediate query step in the sequence of query steps;
in response to receipt of the selection and based upon the intermediate query step, retrieving tabular data from a data cube and displaying the tabular data on the display;
receiving an incremental modification to the query while the tabular data is displayed;
modifying the query based upon the incremental modification to add another query step to the query, wherein the query step is added subsequent to the intermediate query step and prior to a last query step of the query; and
retrieving second tabular data from the data cube, the second tabular data retrieved based upon the intermediate query step and the another query step.

18. The computer-readable storage device of claim 17, the acts further comprising retrieving the second tabular data based upon each query step in the query up to the another query step.

19. The computer-readable storage medium of claim 18, wherein query steps after the another query step in the query are not considered when retrieving the second tabular data.

* * * * *